United States Patent [19]
Hoyt et al.

[11] Patent Number: 6,085,195
[45] Date of Patent: Jul. 4, 2000

[54] INTERNET PHOTO BOOTH

[75] Inventors: Timothy Hoyt; David Foster, both of Miami, Fla.

[73] Assignee: XStasis, LLC, Coral Gables, Fla.

[21] Appl. No.: 09/089,244

[22] Filed: Jun. 2, 1998

Related U.S. Application Data

[60] Provisional application No. 60/048,539, Jun. 3, 1997.

[51] Int. Cl.[7] .................................................. G06F 15/173
[52] U.S. Cl. ................................... 707/10; 709/250; 396/2
[58] Field of Search ............................ 707/10, 102, 513; 709/201, 217, 249, 250; 396/2

[56] References Cited

U.S. PATENT DOCUMENTS

| | | | |
|---|---|---|---|
| D. 410,481 | 6/1999 | Roncal .................................... | D16/215 |
| 5,539,453 | 7/1996 | David et al. ............................... | 348/77 |
| 5,574,511 | 11/1996 | Yang et al. ............................... | 348/586 |
| 5,587,740 | 12/1996 | Brennan ................................... | 348/373 |
| 5,623,581 | 4/1997 | Attenberg ................................. | 395/106 |
| 5,761,071 | 6/1998 | Bernstein et al. ..................... | 364/479.07 |
| 5,781,909 | 7/1998 | Logan et al. ............................. | 707/200 |
| 5,812,765 | 9/1998 | Curtis ...................................... | 709/200 |
| 5,818,446 | 10/1998 | Bertram et al. ......................... | 345/334 |
| 5,826,267 | 10/1998 | McMillan .................................. | 707/9 |
| 5,897,220 | 4/1999 | Huang et al. ............................. | 396/2 |
| 5,913,019 | 6/1999 | Attenberg ................................. | 395/117 |
| 5,940,834 | 8/1999 | Pinard et al. ............................. | 707/102 |
| 5,949,411 | 9/1999 | Doerr et al. ............................. | 345/327 |
| 6,009,429 | 12/1999 | Greer et al. ............................. | 707/10 |

OTHER PUBLICATIONS

Christian, et al, "Digital smart kiosk project", CHI 98, Human Factors in Computing systems, ACM, vol.2, Abstract Only, 1998.

Meade, P "Cyberbooths: the new payphone?", America's network, vol. 101, No. 11, Abstract Only, 1997.

*Primary Examiner*—Jean R. Homere
*Attorney, Agent, or Firm*—Townsend and Townsend and Crew LLP

[57] ABSTRACT

A computer program product for an interactive public kiosk including a processor for automatically forming a web page including an image of a user, includes a computer readable media. The computer readable media includes code that directs the processor to capture an image of the user, and code that directs the processor to modify the image according to a user selected theme to form a modified image. Code that directs the processor to determine a URL address for the web page is disclosed. The computer readable media also includes code that directs the processor to create a file in response to the user selected theme and the modified image, and code that directs the processor to upload the file to be located at the URL address to a server.

20 Claims, 11 Drawing Sheets

INTERNET PHOTO BOOTH

CROSS REFERENCE TO RELATED APPLICATIONS

The following three commonly-owned co-pending applications, including this one, are being filed concurrently and the other two are hereby incorporated by reference in their entirety for all purposes:

1. U.S. patent application Ser. No. 09/082,272, Timothy Hoyt and David Foster, entitled, "Internet Photo Booth;"
2. U.S. patent application Ser. No. 09/082,273, Timothy Hoyt and David Foster, entitled, "Method For Internet Photo Booth;" and
3. U.S. patent application Ser. No. 09/089,244, Timothy Hoyt and David Foster, entitled, "Internet Photo Booth System."

This application claims priority to Provisional Application Ser. No. 60/048,539, filed Jun. 3, 1997, in the name of the present assignee, and hereby incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to publicly located photo kiosks or booths. More particularly, the present invention provides an image capturing device in a kiosk or photo booth that captures digital images of a user in the form of video and/or still pictures. Merely by way of example, the present invention can be applied to technologies such as telephone systems, wide area networks, Internet, and other communication means.

Game, amusement parks, shopping malls, and alike, have commonly distributed photo kiosks for users to take photographic images or Polaroid™ pictures of themselves for entertainment purposes. Various types of these photo kiosks have been used. As merely an example, conventional photo kiosks were generally configured in the form of booths or stalls. The booths were either totally or partially enclosed, where users or subjects could pose against a standard background fixed in the enclosed area or a "blue screen", while the users take a photograph of themselves. Accordingly, users or subjects pose in front of a fixed panoramic view or background of the "Grand Canyon" while in Arizona. Alternatively, the users pose in front of the Magic Kingdom™ castle at Disneyland™ park. In other cases, college or high school students have amused themselves by cramming a large number, often four or five, of themselves into the booth without any specific background for a group picture. After taking the photograph, the photo booth processes the photograph and delivers a finished print to the users. Typically, the finished product was in the form of a photographic image or print or, in some cases, additional prints of the same image could be obtained from the photo booth at an additional cost to the users.

Other types of photo booths having multiple or selectable backgrounds (or foregrounds) were also used or proposed. These photo booths or kiosks included types in which the enclosed or partially enclosed area has been eliminated and in which the user inputs a selected background image. Such photo kiosks, however, have not been user friendly in the sense of providing an effective visually interactive interface with the user to enable consistently acceptable results under the full control of the user and being able to attract users with effective visual displays. In addition, the finished product delivered to the user was in the form of a single image or in the form of additional and separate prints of the same image. Accordingly, the finished product has limited the use and appeal of such photo booths.

Most recently, sticker photo booths have been used. A user of this booth desiring a photograph poses directly in front of the kiosk to have a picture taken against a selected computer generated background and in which a multiple image format in the form of "stickers" on a single sheet is delivered to the user from a frozen image selected by the user. These photo booths have been quite popular in countries such as Japan. Sticker photo booths, however, have numerous limitations. These photo booths, in most cases, only produce stickers and cannot produce single photographic images. Additionally, sticker photo booths generally have been popular with the "younger" generation and have not been accepted uniformly with the "older" crowd. Although the above photo booths have had limited success, they simply cannot remain popular without improvements. Additionally, the above photo booths are limited in the type of output that is derived. In some cases, the output is a photographic image in the form of a Polaroid™ print. Furthermore, some conventional photo kiosks have generally penetrated the entertainment market and have not generally been accepted in commercial settings.

From the above, it is seen that an improved photo kiosk for entertainment purposes or communication purposes is highly desirable.

SUMMARY OF THE PRESENT INVENTION

According to the present invention, a technique, including a system and method, for capturing and transmitting images is provided.

In an exemplary embodiment, the present invention provides a novel computer program product for an interactive public kiosk including a processor, for automatically forming a web page including an image of a user. In particular, the web page is an HTML page having a link to an image. The computer program product includes a computer readable media including code that directs the processor to capture an image of the user, and code that directs the processor to modify the image according to a user selected theme to form a modified image. Code that directs the processor to determine a URL address for the web page is also included. The computer program product also includes code that directs the processor to create a file in response to the user selected theme and the modified image. Preferably the file is written in HTML. Code that directs the processor to upload the HTML file to be located at the URL address to a server is also disclosed.

In an alternative embodiment, the present invention a computer program product for an interactive public kiosk including a processor, a display, a user input device, an output device, and a camera, coupled to a server, for generating an output file, preferably an HTML file, the computer program product including computer readable memory including code that directs the processor to capture an image of the user with the camera, and code that directs the processor to form a modified image in response to the image and to user input form the user input device. Also included are code that directs the processor to display the modified image on the display and code that directs the processor to determine a computer network-based address for the output file. The network-based address is preferably a URL address. Code that directs the processor to generate the output file, typically written in HTML, in response to the modified image and the computer-based address is included. Also included is code that directs the processor to transmit the modified image and the output file with the output device to the server. The server is typically a web server that is located remotely from the interactive public kiosk.

In an alternative embodiment, a computer program for a public photo booth including a processing portion, for outputting modified images, is described including a computer readable media including code that directs the processor to capture a plurality of images of a user, code that directs the processor to display the plurality of images of the user on a display, and code that directs the processor to determine an image of the user from the plurality of images of the user in response to user input. Code that directs the processor to determine another image in response to user input, such as a picture frame, background, and the like is also disclosed. The computer readable media also includes code that directs the processor to form a modified image in response to the image of the user and the another image, for example, a combination of the image of the user and a background, and code that directs the processor to display the modified image on the display, are disclosed. Code that directs the processor to determine a URL for a web page, and code that directs the processor to output the modified image and the URL to a local printer are provided. The embodiment includes code that directs the processor to generate a web page including the modified image; and code that directs the processor to output the web page to a remote server with a modem are also disclosed. In one embodiment, the web page is an HTML file that references the location of a modified image. The remote server is typically a web server. The HTML file is subsequently located at the URL by the web server.

Numerous benefits or advantages are achieved over conventional devices using the present invention. In one aspect, the present invention provides a photo kiosk or kiosk that is easily useable and universally accessible. The photo kiosk or "photo booth" can be used by members of the general public who have substantially no knowledge of or access to computers or digital photography equipment. That is, it enables even the most non-technologically adept person to digitally capture and manipulate professional-quality images and to create their own pages on, for example, the World Wide Web. Additionally, the present invention allows users to launch images of themselves onto a web page, thus enabling users world-wide to view their creations. The present photo booth also has a capability to capture and distribute video images (e.g., stills and moving pictures) in one or more embodiments. Also, it is designed for group use, i.e., it seats 2–3 people comfortably. These advantages can exist alone or together in any combination of one or more embodiments of the present invention. These and other advantages, however, are more fully described throughout the present specification, and more particularly below.

The present invention achieves these benefits and others in the context of known process technology. However, a further understanding of the nature and advantages of the present invention may be realized by reference to the latter portions of the specification and attached drawings.

BRIEF DESCRIPTION OF THE DRAWINGS

FIG. 4B shows a simplified flow diagram (entitled "Theme Select") that provides one of many backgrounds for users to compose their image with;

DESCRIPTION OF SPECIFIC EMBODIMENTS

I. Present System Hardware

Figure 1:
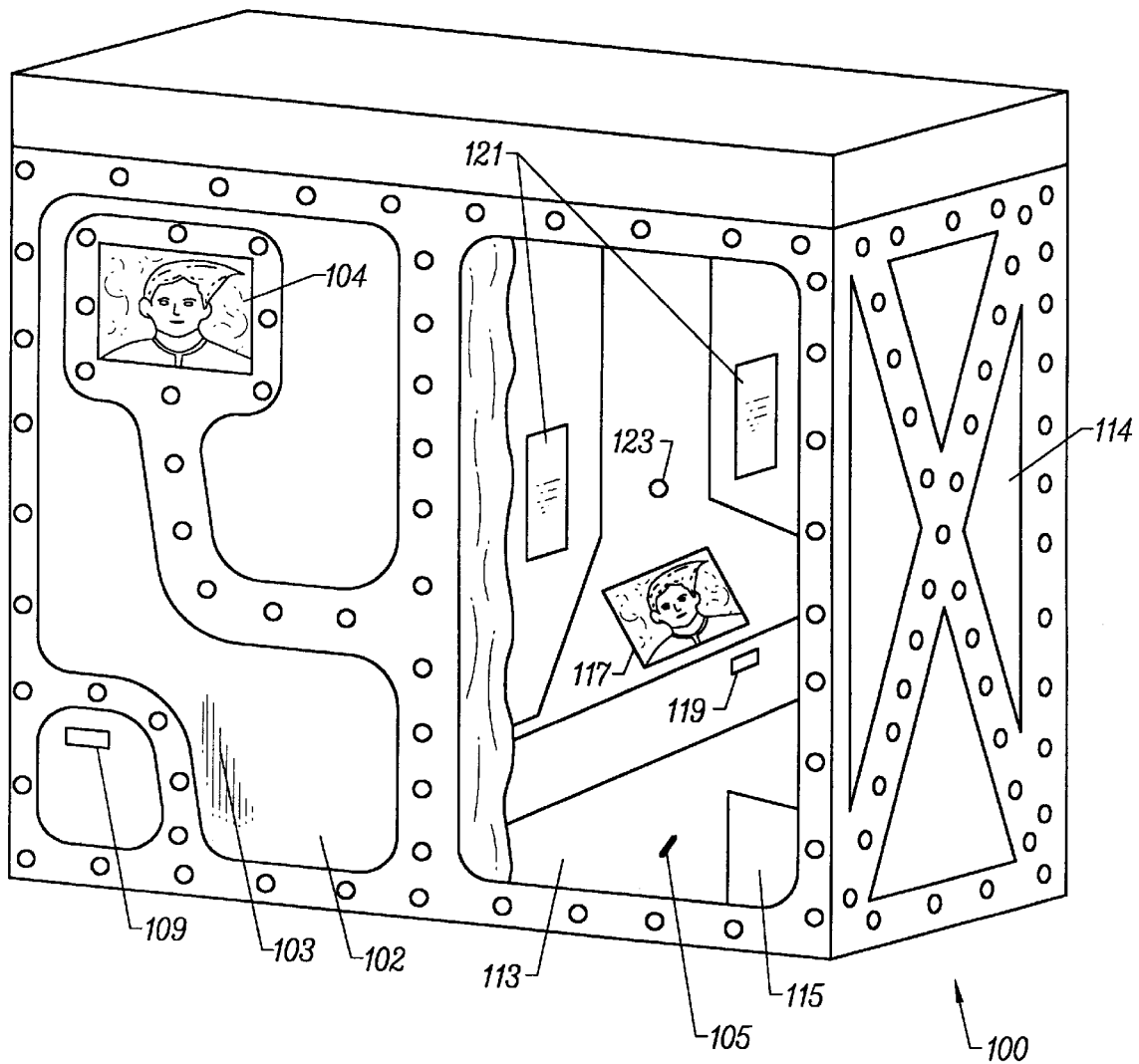
FIG. 1 shows a simplified frontal view of a booth according to an embodiment of the present invention.

FIG. 1 shows a simplified outside view diagram a booth or kiosk 100 according to an embodiment of the present invention. The diagram is merely an illustration and should not limit the scope of the claims herein. One of ordinary skill in the art would recognize other variations, modifications, and alternatives. The booth includes a housing 101 or any suitable enclosure for holding various hardware and software elements, as well as a user(s). The enclosure is often made of a durable material that can withstand one or more human users and can also withstand a variety of environmental conditions or weather such as heat, moisture, and other types of weather or the like. The enclosure is often made of a material such as a combination of wood, metal, and synthetic materials such as plastic or the like. In some applications, the enclosure can also be made of a fiberglass type material. The enclosure is also capable of housing a human user or numerous human users that can use and even abuse the present booth according to aspects of the present invention.

The enclosure or booth includes a variety of element such as exterior region 103 and opening 105, which allows one or more users to enter or exit the booth. The opening is also large enough for handicapped users and alike. The external region is generally capable of being placed or installed easily at numerous locations without substantial set-up costs. In most embodiments, the external region can be installed using conventional power and/or a telephone network line or lines. The exterior region has sides 102, including a backside 114. The external region has an external monitor 107 that displays or outputs a video and/or audio "teaser." The teaser is generally output that attracts people to use the booth. The booth also has a receptacle 109 for output, e.g., one or more photographs, stickers, or hard copies. In most embodiments, the output appears at the receptacle within three minutes or less, or two minutes or less, or one minute or less of capturing an image of the user or users in the booth.

In a specific embodiment, a user(s) enters an interior region 113 of the booth through the opening and performs one or more functions according to embodiments of the present invention. That is, the user sits or even stands on a bench 115, which can be wide and even upholstered. The bench faces a screen 117, which can be a display as well as a display in combination with a user interface, e.g., touch screen. The interior region also includes a vending card reader 119 (or bill, coin, token receptacle, credit card, debit card, ATM card readers, and the like), generally, a user authorization input device, and lights 121 (e.g., one or two or more) which flash at various times including a time when a picture is taken of the user. The interior region also includes audio output devices such as, for example, a stereo amplifier, sub-woofer 120, and stereo speakers 122, which can be implemented behind the user. The interior region also includes a camera 123, which captures images of the user or users. The camera 123 is often covered in a clear plastic or glass material for durability. The interior region also includes an area for electronic or computer hardware such as a central processing unit, which will be used to oversee the various operations in the booth.

Figure 2:
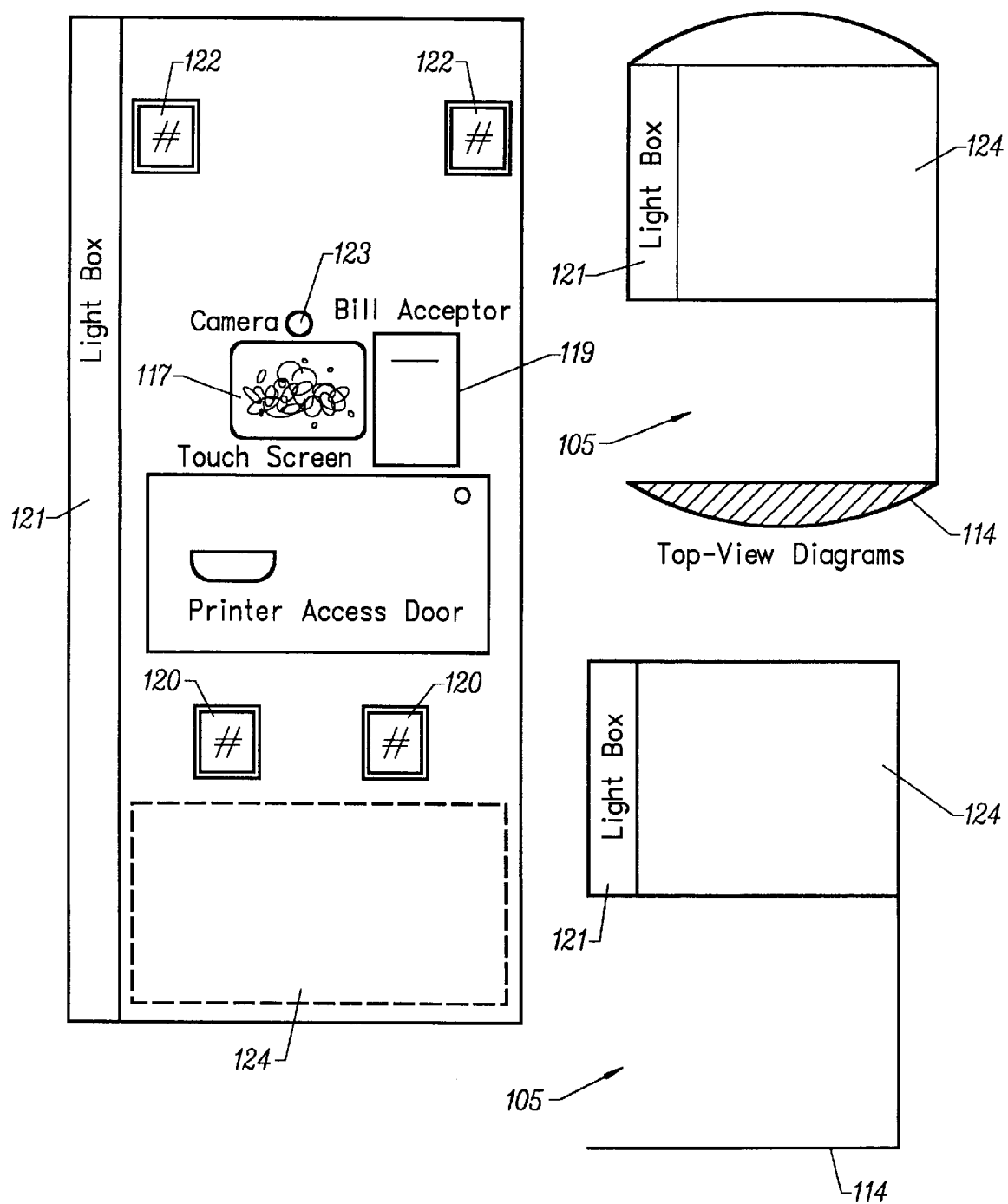
FIG. 2 is a simplified interior diagram of a booth according to an embodiment of the present invention.

FIG. 2 is a simplified interior diagram of a booth according to an embodiment of the present invention. The diagram is merely an illustration and should not limit the scope of the claims herein. Simplified top-view diagrams are also shown. One of ordinary skill in the art would recognize other variations, modifications, and alternatives. The interior diagram includes a variety of elements such as the display or display in combination with a touch screen. The interior region also includes vending card reader 119, and lights 121 (e.g., one or two or more) which flash at various times including a time when a picture is taken of the user. The interior region also includes audio output devices such as, for example, a stereo sub-woofer 120, and stereo speakers 122, which can be implemented behind the user, and audio input devices such as microphones. The interior region also includes camera 123, which captures images of the user or users. The camera 123 is often covered in a clear plastic or glass material for durability. The interior region also includes an area 124 for computer or electronic hardware, such as the central processing unit.

Figure 3:
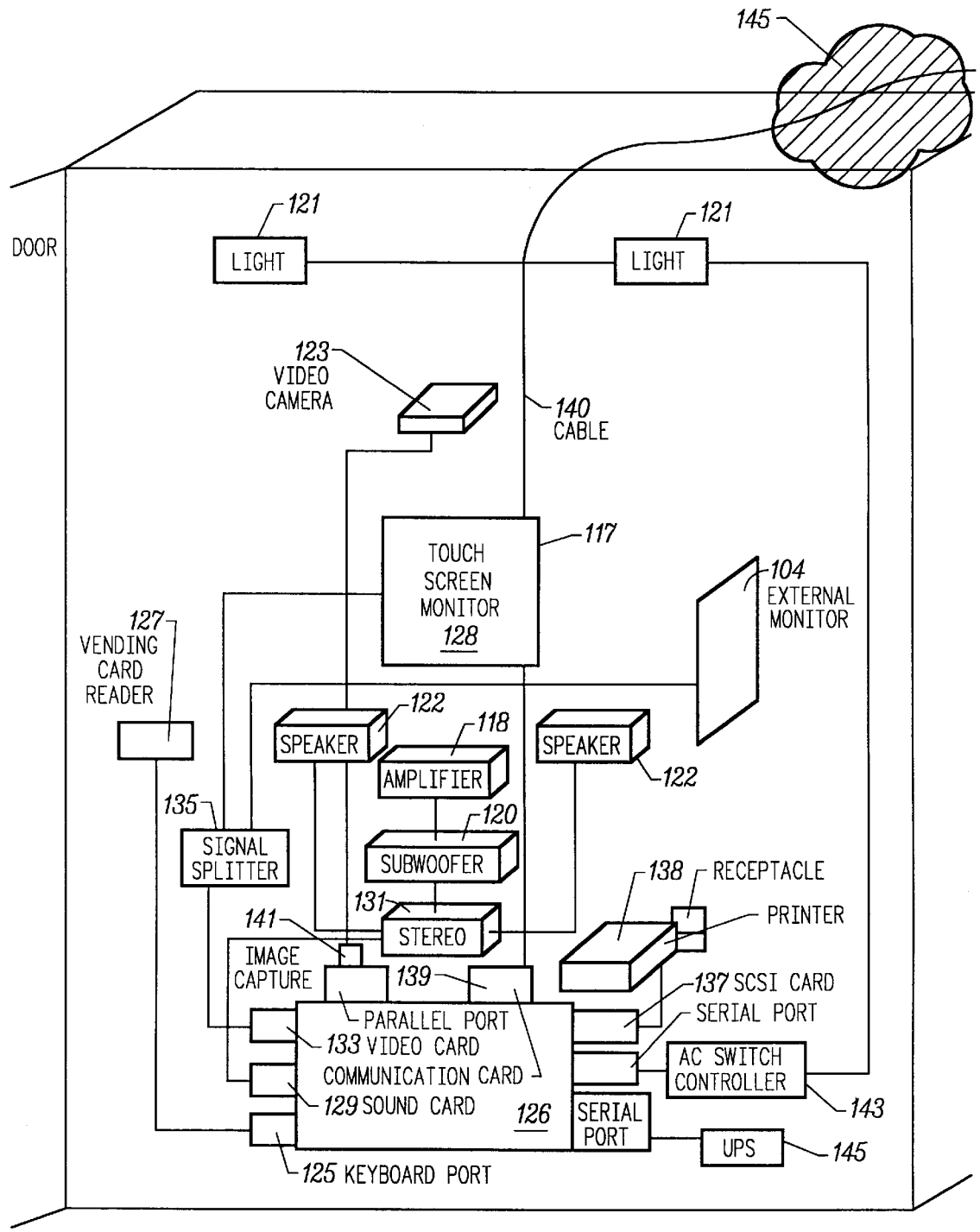
FIG. 3 shows a simplified side view of a booth with a door and hardware components revealed according to an embodiment of the present invention.

FIG. 3 shows a simplified side-view diagram of a booth according to an embodiment of the present invention. The side-view diagram illustrates a variety of functional blocks or elements which can be in the form of hardware or software or a combination of hardware and software. The side-view diagram is merely an illustration and should not limit the scope of the claims herein. One of ordinary skill in the art would recognize other variations, modifications, and alternatives. The booth can include a variety of elements such as a door that is opened. As shown, the elements are partly revealed. The booth includes a computer 126 or any type of central processing unit (i.e., CPU) or the like. The computer can also include any suitable microprocessor based unit such as an IBM PC-compatible system that has a microprocessor unit such as a Pentium™ chip manufactured by Intel Corporation of Santa Clara, Calif., or equivalent. The CPU is coupled to a variety of other elements such as a keyboard port 125, which is coupled or connect to a vending card reader 127 or other bill, coin, or token receptacle.

The CPU also connects to or is coupled to other input devices. The input devices can include command input devices suitable for accepting user input commands, for example, a touch screen 128, a writing tablet, a computer mouse, a joystick, a trackball, push-button(s) and/or knobs, a keypad, a keyboard, a speech-recognition or keyword spotting system (e.g., including microphone), an image or motion detection or recognition system (e.g., a text-, handwriting-, face-, sign-language, etc.-recognition system, etc.), and others. In the specific embodiment, the input device includes a touch screen 128 implemented on the display itself.

The CPU is also coupled to an audio output device such as a sound card 129, which is coupled or connected to a stereo receiver 131, which is coupled or connected to stereo speakers 122 and the stereo sub-woofer 120. The audio output device can also be coupled to one or more speakers, which can include sub-woofers and sub-sonic speakers, audio synthesizers, buzzers, bells, and others audio output means, depending on the particular configuration chosen. An amplifier 118 coupled to the stereo can also be included. The CPU is also coupled or connected to a video display card 133, which is coupled to or connected to a signal splitter 135, which is coupled to or connect to touch screen monitor and external monitor 104. The monitor or display can be any suitable computer-type display, for example, a cathode ray tube video display, a flat panel display (e.g., a liquid-crystal display), and others, depending on the particular configuration chosen. The display can also include or be supplemented with lights, indicator lights, strobe lights, LEDs, and the like. In a specific embodiment of the invention, the visual display is a computer-type display. Other types of output devices can include, among others, smoke emitters, smell emitters, seat mover/shakers, liquid or water spray devices, vibrators, wind machines, and the like.

The CPU also couples to or connects to a standard interface card, such as a small computer standard interface (SCSI) card 137, EIDE, and the like. SCSI card connects to or couples to an output device for hard copies such as, for example, a dye sublimation printer 138, whose output goes into the receptacle for photographs. In preferred embodiments, the CPU connects to or is coupled to a communication device 139 or network interface card, which connects to a transmitting and/or receiving device. The transmitting and/or receiving device can include either wireless or wired elements such as cable or a telephone line. Alternatively, the CPU connects to or is coupled through a modem and a phone line or cable to a wide area network of computers. As merely an example, the device can be a cable 140 which runs out of an upper region of the booth and plugs into a computer network or phone line provided by a venue or selected geographic location, e.g., theme park, mall, golf course, hotel, motel, store, business, gas station, airport, festivals, trade shows, cruise ships, train terminals, arcades, bars, clubs, and organizational meetings such as reunions and the like.

The CPU also couples to or connects to an image processing device 141. The image processing device can be, for example, a Snappy image capture device made by Play, Inc. This image processing device couples to or connects to video camera 123, e.g., CCD camera. The camera is directed to or points to the user or users. The CPU also connects to or is coupled through a serial port, for example a USB, and the like, to a switch controller 143, which can be an AC switch controller or the like. The switch couples through a serial port, parallel port, USB port, or other computer interface to a switch controller, which can selectively turned off and on the lights. The CPU also connects to or couples through a serial port, parallel port, USB port, or other computer interface to a switch controller to a UPS 145 (i.e., Uninterrupted Power Supply). An AC power supply (e.g., 120 Volt/60 Hertz) of the CPU also connects to or is coupled to the UPS.

The CPU also uses or is connected to attendant support chips, buses, and interfaces. The CPU also runs under the direction of software manufactured by Xstasis, L.C. at least partially residing during run-time in a computer readable media, such as a random access memory (RAM). The software also may reside in nonvolatile storage, such as a hard disk, flash memory, CD-ROM, DVD, removable disk memory, floppy disk, flash cards, and others. The storage device or devices also includes content for describing specific themes or experiences. These memory devices store can store the software features described throughout the present specification, as well as others.

The network interface card provides access to an external network 145, such as the Internet, using network protocols, for example TCP/IP, and others, depending on the particular network type. Network interfaces, as well as details for connecting with specific networks, such as local area networks, wide area networks, intranets, extranets, and the Internet, are generally conventional, but can be tailored for the specific application. A network server will receive captured data from the booth and the like at a remote location, for example.

Although the above description has generally been described in terns of hardware, the functionality of the above can be replaced by a combination of hardware and/or software. The hardware can also be further separated into other hardware and/or software elements. Additionally, the hardware can also be combined or integrated together as a single element, a module, or integrated circuit chip. Accordingly, the above descriptions should not limit the scope of the claims herein. One of ordinary skill in the art would recognize other variations, modifications, and alternatives.

Additionally, although the above diagrams show a booth that is totally enclosed, a variety of other types of booths can be used. As merely an example, the booth can be partially enclosed and does not include a bench, for example. Additionally, the backside of the booth can be replaced with a movable or temporary screen or the like. Accordingly, the present booth as shown should not limit the scope of the claims herein. One of ordinary skill in the art would recognize other variations, modifications, and alternatives.

II. Present Methods and Computer Programs

A. Overall Flow Diagram and Method

Figure 4:
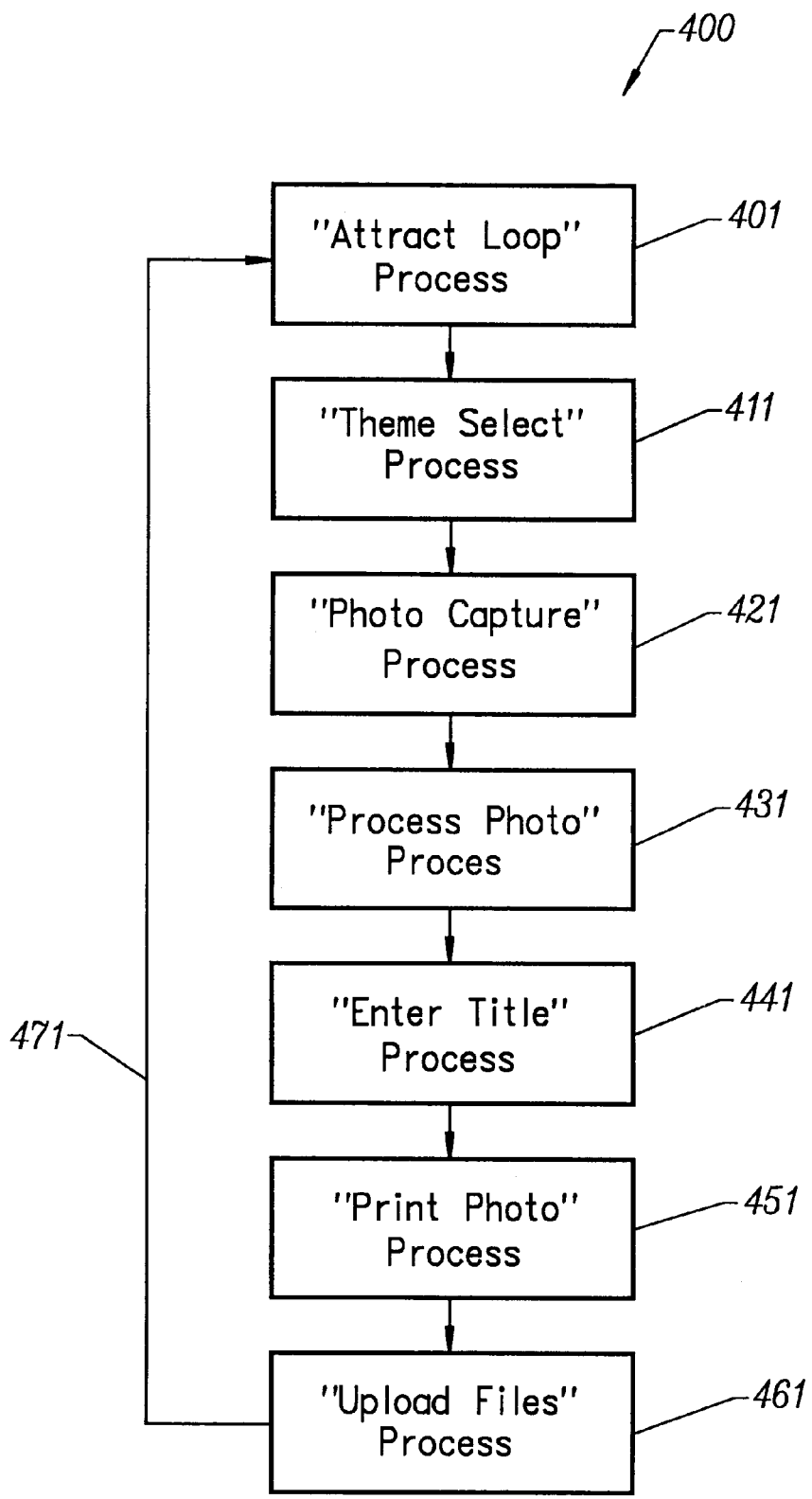
FIG. 4 is a simplified flow diagram of a general method according to an embodiment of the present invention.

FIG. 4 is a simplified flow diagram 400 of a general method according to an embodiment of the present invention. The flow diagram is merely and illustration and should not limit the scope of the claims herein. One of ordinary skill in the art would recognize other variations, alternatives, and modifications. The method can be implemented by way of computer software and/or hardware. The flow diagram 400 includes a variety of steps. The steps begin with one or more modules or process steps, which will be described in more detail below, but will be generally described as follows. In a specific embodiment, the present method uses an attract loop to lure or attract a user or users (i.e., customers) to a booth, such as the one in the above Figs. The attract loop (step 401) uses a monitor that outputs or displays a video and/or audio program, also called a "teaser," to demonstrate an operation and/or benefits of the present booth. The user approaches the booth, and if successful, steps inside the booth or in front of the interior display monitor. In some embodiments, the user also sits down on the bench inside the booth before carrying out the methods described herein as well as others.

Once inside the booth, the user selects a "theme" using a theme select process, step 411, according to a specific embodiment. In particular, the user sits in front of a user interface such as a touch screen on the display. The touch screen display prompts the user to insert a vending card or the like, which has been purchased from a venue owner. Alternatively, money such as bills or coins or tokens can be used, or credit/debit/ATM cards can also be used. The user inserts the card. The touch screen displays a second montage, culminating in a screen which asks the user to choose a background theme or a selected number of background themes. The user selects a background theme by way of the touch screen.

In a specific embodiment, the method then captures the user's image in digital form, step 421. In a specific embodiment, the method captures one or more than one, such as three or more images, from the user. The images can be captured in combination with light bulb flashes, which are used to illuminate the user. Alternatively, the light bulb flashes can also provide a signal or indication to the user upon completion of the capturing process. The image of the user and background form the picture. The picture is displayed on the screen for user viewing. The user selects one or more of the pictures, which are provided on one or more themes or backgrounds. Selection occurs by way of the touch screen.

A process photo process (step 431) is performed according to a specific embodiment. The photo process step uses image processing techniques to convert the picture into a usable graphical or information format. In a specific embodiment, the photo process converts the picture into a usable format such as a JPEG file for a web page on the world wide web or Internet. The present process also converts the picture into a bitmap file or other format (e.g. GIF) for outputting onto a hard copy device. Accordingly, the selected image is converted into a web page file or a hard copy.

A title can be selected for the picture, as shown in step 441, according to an embodiment. Here, the user decides upon a title and enters a title for his/her picture using an alphanumeric display or keyboard displayed on the touch screen. Alternatively, the user may use a different interface device such as a standard keyboard for entering the title and other alphanumeric information.

Audio samples may be combined with the picture. For example, a prerecorded sound clip may be automatically associated to the picture. By way of example, the Disney theme music may be coupled to a picture taken is Disney Land. Alternatively the user can record a short audio clip to be associated with the picture. By way of example, the user can record a "wish everyone they were here" message that is associated with the picture.

In a specific embodiment, the present method uses a print photo process, step 451. The print photo process composes the picture into a photo along with the title and a selected address or Uniform Resource Location, (URL) that indicates where the picture can be found on the Web or Internet. That is, the URL is created for the user. Additional information includes, among others, title, time, and location of booth such as venue, where the image has been acquired. Next, the process prints the picture with title and preferably the URL text. The process also prints out a hard copy of the picture using, for example, a color printer or other output device. The picture can include a variety of features such as the title, the name of the venue where the booth is located, the background, address (e.g., URL), and other elements. The picture can also be in the form of stickers, which are multiple pictures. Alternatively, the picture can be in the form of a postcard or the like.

In a specific embodiment, the method also has a step of uploading (step 461) the information as one or more files. The uploading process converts the title, the picture, and other information into a widely used formats including, for example, hypertext markup language (i.e., HTML) and a data file. The HTML file is permanently or temporarily stored onto a memory device such as a hard disk, which holds the HTML file. The data file is also stored in the memory device or other memory storage media. The HTML, the data file (JPG image) are uploaded onto, for example, a web server or multiple web servers. As merely an example, the server is a central server such as, for example, "PhotoPod.com server," but can be others. The server categorizes the files in specific locations or in a data base. The server is coupled to a wide area network of computers such as the Internet, as well as other like networks.

The method returns from step 461 to the attract loop 401 process by way of branch 471. The flow diagram above merely shows a generalized sequence of steps according to an embodiment of the present invention. The flow diagram can also include additional steps. Additionally, the sequence of steps can be altered depending upon the application. Furthermore, the steps can be further combined or even separated depending upon the application. Selected details with regard to each of the steps, noted above, are show in references to the Figs. below.

Although the booth utilizes a video camera in a specific embodiment, alternative embodiments would include capturing video rather than stills from the users or customers. These live videos would be available for manipulation. The captured video would be uploaded to the web page and/or transferred onto a VHS tape or digital video disco or some other physical medium available in the booth or other location. The image capture device could also be located in a kiosk or another publicly located space other than a booth. Additionally, the present booth can use an ink jet printer or any other kind or high speed photographic quality color printer could be used instead of a dye sublimation printer. In some embodiments, the present vending card reader could be replaced by a bill, coin, or token acceptor or a credit card or debit card reader. Furthermore, the present network connection cable could be replaced by a cable leading to a modem and a telephone.

Accordingly, the present flow diagrams above merely show a generalized sequence of steps according to one or more embodiments of the present invention. The flow diagrams can also include additional steps as well as use other hardware elements. Additionally, the sequence of steps can be altered depending upon the application. Furthermore, the steps can be further combined or even separated depending upon the application. Selected details with regard to each of the steps, noted above, are show in references to the Figs. below.

B. Detailed Flow Diagrams and Methods

1. Attract Loop Flow Diagram

Figure 4A:
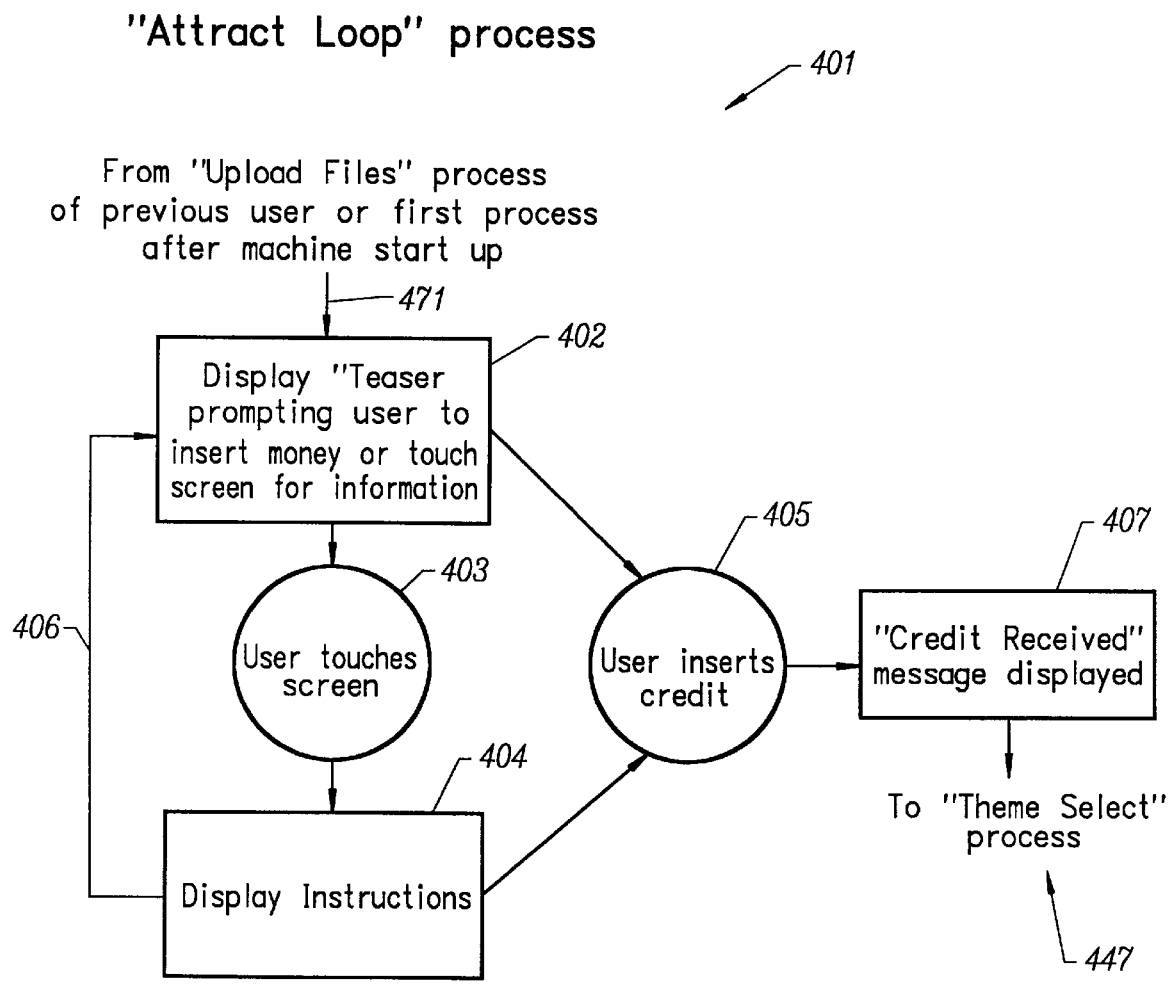
FIG. 4A shows a simplified flow diagram (entitled "Attract Loop") that plays a video montage.

FIG. 4A (entitled "Attract Loop") is a simplified flow diagram 401 of an attract loop according to an embodiment of the present invention. In a specific embodiment, the present method uses an attract loop to lure or attract a user or users (i.e., customers) to a booth, such as the one in the above Figs. The attract loop (step 401) uses a monitor that outputs or displays (step 402) a video and/or audio program, also called a "teaser," to demonstrate an operation and/or benefits of the present booth. The user approaches the booth, and if successful, steps inside the booth or in front of the interior display monitor. In some embodiments, the users also sit down on the bench inside the booth. The user touches (step 403) to begin the method or process. The display outputs instructions (step 404) onto the screen of monitor. The user inserts credit (step 405) into the receptacle. Once the credit is received, a "credit received" message is displayed, step 407. The method proceeds to the theme select process, step 441. Alternatively, the user does not insert a credit and the method returns via branch 406 to step 402, which attempts to attract another potential user or customer.

2. Attract Loop Computer Codes

In a specific embodiment, the attract loop can be in implemented in code of a computer program written in Macromedia Director available from Macromedia, Inc. It displays a video montage of the use and operation of the present booth. The present computer program has been written in Macromedia Director, but can also written in a variety of other programs. An example of a program listing is shown below.

```
Attract Loop: global helpList, helpCounter, nextMovie
on startMovie
    startTimer
    set nextMovie=FALSE
    set helpCounter=1
    set helpList=[31,32,33,34,-99] end
on keyDown
    if nextMovie=FALSE then
        if (the key=4) or (the key="g") then
            puppetSprite 14, FALSE
            puppetSprite 15, FALSE
            puppetSprite 16, FALSE
            set nextMovie=TRUE
            go to frame "ThankYou"
        end if
    end if end
on exitMovie
    go to frame 1 of movie "background" end on enterFrame
    set the volume of sound 2 to 100 end on exitFrame
    go to frame "External Loop" end on exitFrame
    startTimer
    go to frame "Help Prompt" end global helpCounter
on enterFrame
    set helpCounter=1 end
on exitFrame
    if the timer<300 then
        go to the frame
    else
        startTimer
        go to frame "external loop"
    end if end on enterFrame
    puppetSprite 14, TRUE
    puppetSprite 15, TRUE
    puppetSprite 16, TRUE end
on exitFrame puppetSprite 14, FALSE
    puppetSprite 15, FALSE
    puppetSprite 16, FALSE
    go to frame "Insert" end on exitFrame
    startTimer
    repeat while the timer<200
        nothing
    end repeat
    set nextMovie=FALSE end on enterFrame
``` set the volume of sound 2 to 200 end on exitFrame
exitMovie end global helpList, helpCounter
on mouseDown
   set the memberNum of sprite 14 to 9
   updatestage
   waitForIt
   set the memberNum of sprite 14 to 10
   updateStage
   waitForIt
   waitForIt
   set the memberNum of sprite 14 to 9
   updateStage
   waitForIt
   set the memberNum of sprite 14 to 8
   updateStage
   pageUp end
on waitForIt
   startTimer
   repeat while the timer<3
     nothing
   end repeat end
on pageUp
   set helpCounter=helpCounter−1
   set helpPage=getAt(helpList, helpCounter)
   set the memberNum of sprite 16=helpPage
   updateStage
   if helpCounter=1 then
   turnOffButton
   end if
   if helpCounter=3 then
     turnOnButton
   end if end
on turnOffButton
   if the member of sprite 14=member "buttonup1" then
     set the member of sprite 14 to member "cover5"
     updateStage
     waitForIt
     set the member of sprite 14 to member "cover4"
     updateStage
     waitForIt
     set the member of sprite 14 to member "cover3"
     updatestage
     waitForIt
     set the member of sprite 14 to member "cover2"
     updateStage
     waitForIt
     set the member of sprite 14 to member "cover"
     updateStage
   end if end
on turnOnButton if the member of sprite 15=member "cover" then
   set the member of sprite 15 to member "cover2"
   updatestage
   waitForIt
   set the member of sprite 15 to member "cover3"
   updatestage
   waitForIt
   set the member of sprite 15 to member "cover4"
   updatestage
   waitForIt
   set the member of sprite 15 to member "cover5"
   updateStage
   waitForIt
   set the member of sprite 15 to member "buttondown1"
   updatestage
end if end global helpList, helpCounter
on mouseDown
   set the member of sprite 15 to member "buttondown2"
   updateStage
   waitForIt
   set the member of sprite 15 to member "buttondown3"
   updatestage
   waitForIt
   waitForIt
   set the member of sprite 15 to member "buttondown2"
   updateStage waitForIt
   set the member of sprite 15 to member "buttondown1"
   updateStage
   pageDown end
on waitForIt
   startTimer
   repeat while the timer<3
     nothing
   end repeat end
on pageDown
   set helpCounter=helpCounter+1
   set helppage=getAt(helpList, helpCounter)
   set the memberNum of sprite 16 helpPage
   updateStage
   if helpCounter=2 then
   turnOnButton
   end if
   if helpCounter=4 then
     turnOffButton
   end if end
on turnOffButton
   if the member of sprite 15=member "buttondown1" then
     set the member of sprite 15 to member "cover5"
     updatestage
     waitForIt
     set the member of sprite 15 to member "cover4"
     updatestage
     waitForIt
     set the member of sprite 15 to member "cover3"
     updateStage
     waitForIt
     set the member of sprite 15 to member "cover2"
     updateStage
     waitForIt
     set the member of sprite 15 to member "cover1"
     updatestage
   end if end
on turnOnButton if the member of sprite 14=member "cover1" then
   set the member of sprite 14 to member "cover2"
   updateStage
   waitForIt set the member of sprite 14 to member "cover3"
   updateStage
   waitForIt
   set the member of sprite 14 to member "cover4"

```
updatestage
waitForIt
set the member of sprite 14 to member "cover5"
updatestage
waitForIt
set the member of sprite 14 to member "buttonup1"
updatestage
end if end on mouseDown
set the memberNum of sprite 12 to 15
updatestage
waitForIt
set the memberNum of sprite 12 to 16
updatestage
waitForIt
waitForIt
set the memberNum of sprite 12 to 15
updatestage
waitForIt
set the memberNum of sprite 12 to 14
updatestage
go to frame "help" end
on waitForIt
    startTimer
    repeat while the timer<3
        nothing
    end repeat end on mouseDown
set the memberNum of sprite 13 to 18
updatestage
waitForIt
set the memberNum of sprite 13 to 19
updateStage
waitForIt
waitForIt
set the memberNum of sprite 13 to 18
updateStage
waitForIt
set the memberNum of sprite 13 to 17
updateStage
startTimer
go to frame "Insert" endon waitForIt
startTimer
repeat while the timer<3
    nothing
end repeat end on mouseup
go to frame "Internal Loop" end on mouseDown
set the member of sprite 17 to member "exithelp2"
updatestage
waitForIt
set the member of sprite 17 to member "exithelp3"
updateStage
waitForIt
set the member of sprite 17 to member "exithelp2"
updateStage
waitForIt
set the member of sprite 17 to member "exithelp1"
updatestage
puppetSprite 14, FALSE
puppetSprite 15, FALSE
puppetSprite 16, FALSE
    go to frame "Insert" end
on waitForIt
    startTimer
    repeat while the timer<3
        nothing
    end repeat end
```

The above computer code is merely an example of one way to implement the present invention. The computer code is not intended to be limiting the scope of the claims herein in any manner. One of ordinary skill in the art would recognize other languages can be used and variations, modifications, and alternatives can be made.

1. Theme Select Flow Diagram

Figure 4B:
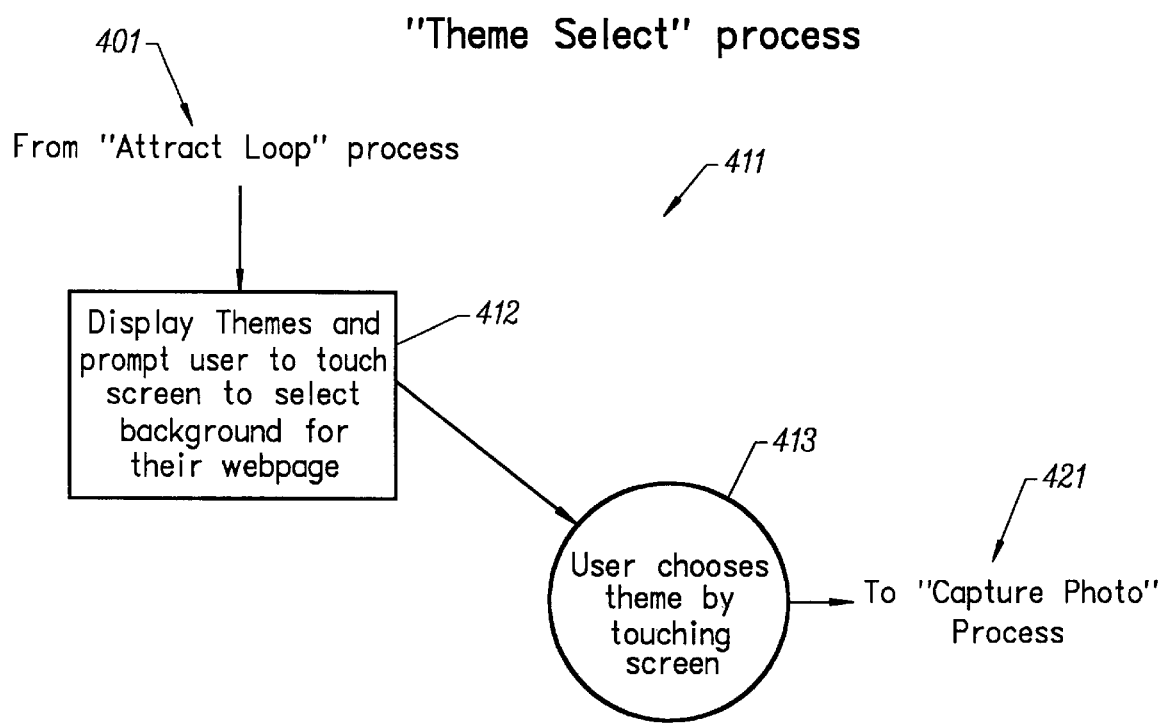

FIG. 4B (entitled "Theme Select") is a simplified flow diagram of a theme select process according to an embodiment of the present invention. Once inside the booth, the user selects a "theme" using a theme select process, step 411, according to a specific embodiment. As previously noted, the user sits in front of a user interface such as a touch screen on the display. The touch screen display prompts the user to insert a vending card or alike, which has been purchased from a venue owner. Alternatively, money such as bills or coins, or plastic such as credit cards, debit cards, or ATM cards can be used. The user inserts the card. The touch screen displays (step 412) a second montage, culminating in a screen which asks the user to choose a background theme or a selected number of background themes. The user selects (step 413) a background theme by way of the touch screen. The method goes to the next step, which is the capture photo process, but can be others.

2. Theme Select Computer Codes

In a specific embodiment, the present theme select process is implemented as code of a computer program, which is called "background." The present computer program has been written in Macromedia Director, but can also written in a variety of other programs. The present process enables customers or users to choose a background to be placed behind or in front of their image. An example of a program listing is shown below.

```
background: global gCommPort, slaveOff
on writeFile
    put FileIO(mNew,"write", the pathname &
        "composite.txt") into writeObj
    set filetext=field "info"
    writeObj(mWriteString, fileText)
    writeObj(mDispose) end
on initCommport
    openXlib (the pathname & "commport")
    if objectP(gCommPort) then gCommPort(mDispose)
    put commport(mNew,"com4", 10000,10000) into gCom-
        mPort
    gCommPort(mSetUp,2400,10,0) end
on extMonitorOff
    setOffText
    gCommPort(mWriteFlush)
    gCommPort(mWriteString,slaveOff)
    gCommPort(mWriteString,slaveOff) end
on setOffText
    put field "slaveOffField" into slaveOff end
on disableCommport
    if objectP(gCommPort) then gCommPort(mDispose) end
On exitMovie
    disableCommport
    go to frame 1 of movie "capture" end on enterFrame
```

```
if the timer>2000 then
    put "bgr008.bmp" into line 1 of field 16
    put "tile08.gif" into line 2 of field 16
    put "ban008.bmp" into line 3 of field 16
    put "#000000" into line 4 of field 16—Text Color
    put "#660066" into line 5 of field 16—Link Color
    put "#80FFFF" into line 6 of field 16—Text color 2
    put "R0 G0 B215" into line 7 of field 16—Print Font
        Color
    writeFile
    exitMovie
end if end
on exitFrame
    go to the frame end
```

The above computer code is merely an example of one way to implement the present invention. The computer code is not intended to be limiting the scope of the claims herein in any manner. One of ordinary skill in the art would recognize other variations, modifications, and alternatives.

1. Photo Capture Flow Diagram

Figure 4C:
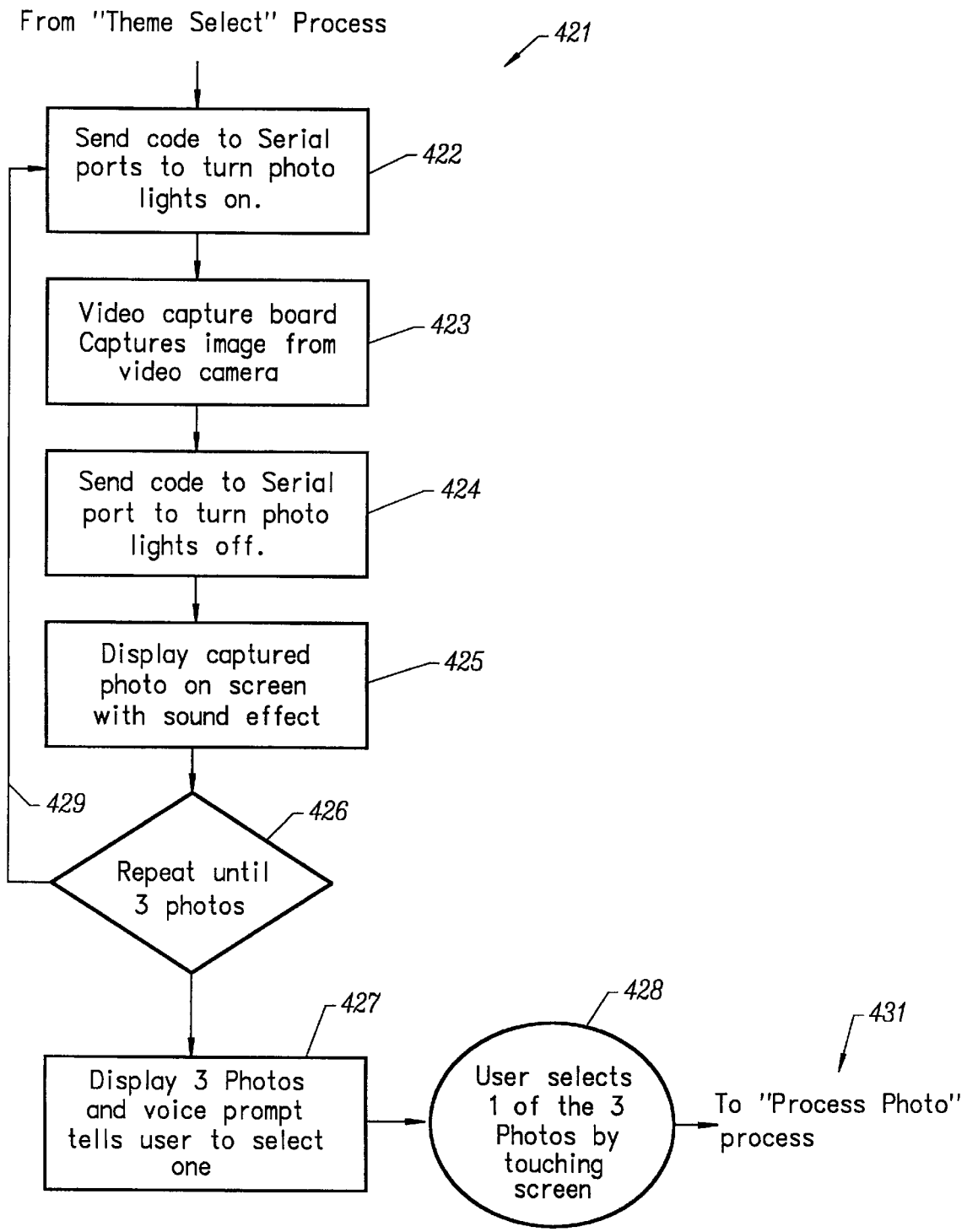
FIG. 4C shows a simplified flow diagram (entitled "Photo Capture") that captures a user's image.
Figure 4D:
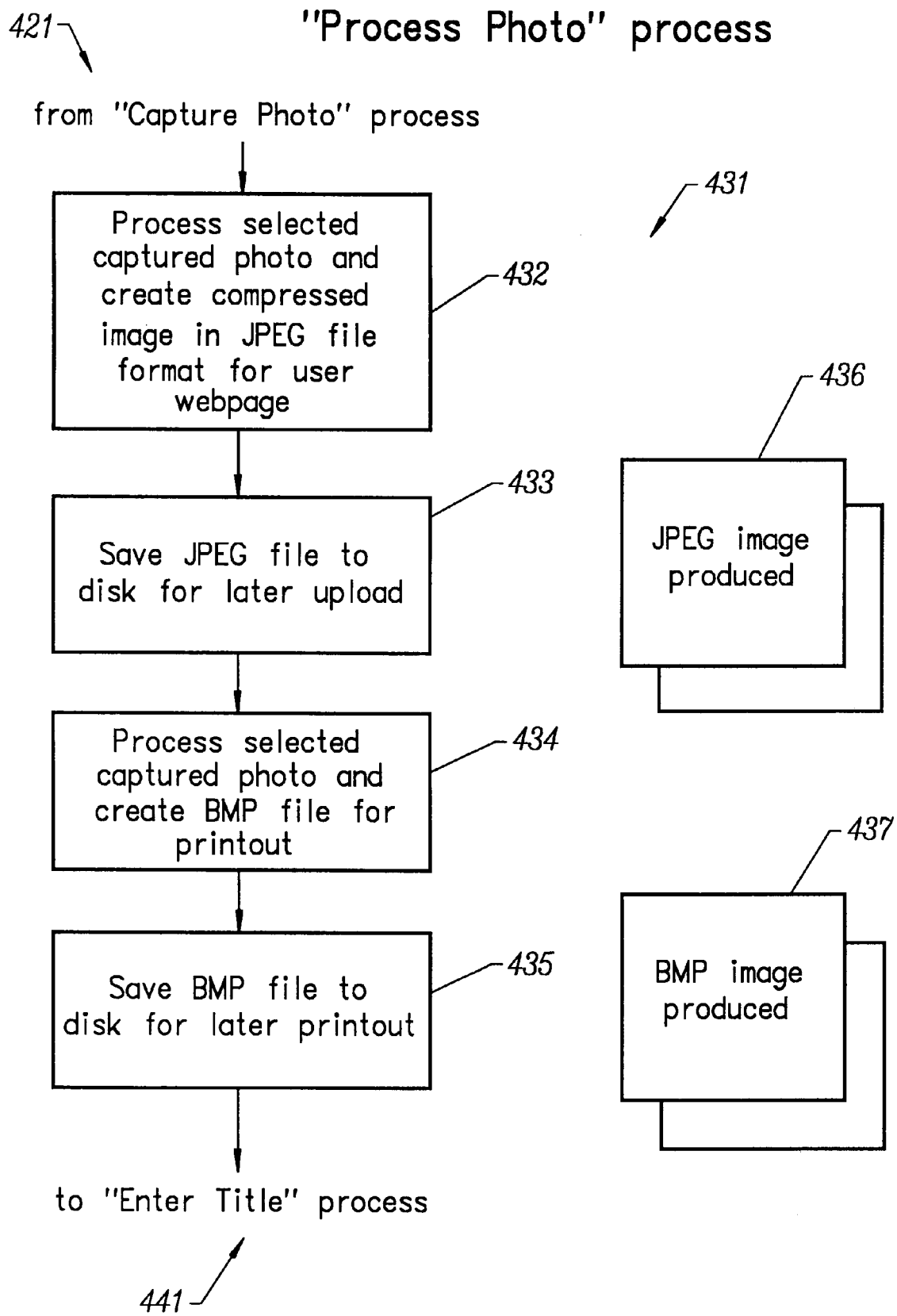
FIG. 4D shows a simplified flow diagram (entitled "Process Photo") which converts a captured image into transferrable information.

FIG. 4C (entitled "Photo Capture") is a simplified flow diagram 421 of a photo capture process according to an embodiment of the present invention. In a specific embodiment, the method then captures the user's image in digital form, step 421. In a specific embodiment, the method captures one or more than one, such as three or more images, from the user. In particular, the method sends via a processing unit a signal to a serial port to turn photo lights on, step 422. The images can be captured in combination with light bulb flashes, which are used to illuminate the user. Alternatively, the light bulb flashes can also provide a signal or indication to the user upon completion of the capturing process. The image of the user and background form the picture, which is captured by the image capture device, step 423. The picture is displayed (step 425) on the screen for user viewing. In some embodiments, the picture display also occurs with sound or other special influences. The process is repeated, step 426, for a selected number of times via branch 429. Once the desired number of processes are repeated, the selected number (e.g., three) of pictures are displayed on the monitor for viewing. The user selects (step 428) one or more of the pictures, which are provided on one or more themes or backgrounds. Selection occurs by way of the touch screen. The method goes to the process photo process (step 431), but is not limited to this process.

2. Photo Capture Computer Codes

In a specific embodiment, the present capture process includes at least three parts, which have been referenced in this manner for reading convenience, but is not limited to these three parts. The first is the code of a computer program written in Macromedia Director which helps enable the computer to capture an image from the camera and the Snappy image capture device. The second is a description of a program written in C++ (an "Xtra") which helps integrate the image capture into the rest of the sequence performed by the booth. The third is the code of a program written in Macromedia Director which enables the customer to choose which of the three photographs they like best.

Part One (Written in Macromedia Director)
```
global captureNum, CountDown, captureList, gCommPort
on enterFrame
    put 5 into field "numberField"
    set captureNum=0
    set CountDown=6
    set captureList=["photo1.bmp","photo2.bmp",
        "photo3.bmp"]
    put "Snapping your photo in . . . " into field "message-
        Field"
    if not xtraLoaded("Snappy") then
        if not fileExists(the pathName & "Snappy.X32") then
            if not fileExists(the pathName &
                "Xtras\Snappy.x32") then
                go to frame "No Snappy Xtra"
                return
            else
                openxlib the pathName & "Xtras\Snappy.x32"
            end if
        else
            openxlib the pathName & "Snappy.x32"
        end if
        if not xtraLoaded("Snappy") then
            go to frame "Bad Snappy open"
            return
        end if
    end if
    initializeSnappy
    SetCameraNotTape(TRUE)
    SetSVideoNotComposite(FALSE)
    SetTermination(TRUE)
    SetSlowFineNotFastRough(TRUE)
    SetSnapMode(1)—Moving
    SetPictureSize(800,600)
    SetBrightness(0)
    SetContrast(0)
    initCommport end
on fileExists theFile
    set thePath to pathOnly(theFile)
    if thePath=EMPTY then set thePath to the pathName
    set fileName to fileOnly(theFile)
    repeat with i=1 to the maxInteger
        set thisFile to getNthFileNameInFolder(thePath, i)
        if thisFile=EMPTY then return FALSE if thisFile=
            fileName then
    return TRUE
    end repeat
    return FALSE end
on fileOnly thePath
    set oldDelim to the itemDelimiter
    set the itemDelimiter to ":"
    if the machineType>=256 then set the itemDelimiter to
        "\"
    set ni to the number of items in thePath
    set returnValue to item ni of thePath
    set the itemDelimiter to oldDelim
    return returnValue end
on xtraLoaded xtraName
    set nx=the number of xtras
    repeat with i=1 to nx
        if the name of xtra i=xtraName then return true
    end repeat
    return FALSE end
on initializeSnappy
    set err=InitSnappy( )
    if err=1 then
        put "Snappy initialized" into field "messageField"
    else
        put "Error initializing Snappy" into field "message-
            Field"
        go to the frame "Bad Snappy Open"
```

```
end if end
on initCommport
    openXlib (the pathname & "commport")
    if objectP(gCommPort) then gCommPort(mDispose)
    put commport(mNew,"com4",10000,10000) into gCom-
        mPort
    gCommPort(mSetUp,2400,10,0) end
global captureNum, CountDown, gCommPort, msterOn,
On enterFrame
    waitasec
    set countDown=countDown-1
    put countDown into field "numberField"
    updatestage end
on waitAsec startTimer
    repeat While the timer<55
        nothing
    end repeat end
on exitFrame
    if countDown=3 then puppetSound 3, "buildflash"
    if countDown<="0" then
        if captureNum=0 then firstCapture
        set captureNum=captureNum +1
        turnOn
        go to frame "Flash"
    else
        go to the frame
    end if end
on turnOn
    setOnText
    gCommPort(mWriteFlush)
    gCommPort(mWriteString,msterOn)
    gCommPort(mWriteString,msterOn) end
on setOnText
    put field "msterOnField" into msterOn end
on firstCapture
    set the fileName of member "processing" to the pathName
        & "processing.bmp"
    —set the registration point to be the center
    set the regPoint of member "processing" to point?
        (((the left of the rect of member "processing")?
        +(the right of the rect of member "processing"))/2,?
        ((the top of the rect of member "processing")?
        +(the bottom of the rect of member "processing"))/2)
            end global msteroff
On enterFrame
    snapPicture( )
    pause end
on idle
    put snappyStatus( ) into field "MessageField"
    updateStage—if snappyStatus( )="Acquiring: 0%" then
        turnOff
    if snappyStatus( )="Snappy Data Ready" then
        turnOff
        continue
    end if end
on turnOff
    setOffText
    gCommPort(mWriteFlush)
    gCommPort(mWriteString,msterOff)
    gCommPort(mWriteString,msterOff) end
on setOffText
    put field "msterOffField" into msterOff end global
        captureNum,
CountDown
on enterFrame
    reactionSounds
    resetCounter end
on reactionSounds
    —play reaction sounds
    if captureNum=1 then
        puppetSound 4, "hmmm"
    end if
    if captureNum=2 then
        puppetSound 4, "laugh1"
    end if
    if captureNum=3 then
        puppetSound 4, "laugh2"
    end if
    updateStage end
on resetCounter
    if captureNum<3 then
        startTimer
        repeat while the timer<180
            nothing
        end repeat
        set countDown=6
        set status="Snapping your image in."
        put status into field "messageField"
        puppetSound 4, "again"
        startTimer
        repeat while the timer<70
            nothing end repeat
        puppetSound 4, 0
        go to frame "countdown"
    else
        startTimer
        repeat while the timer<200
            nothing
        end repeat
    end if end global captureNum, captureList
on enterFrame
    getImage end
on getImage
    set the fileName of member "processing" to the pathName
        &
    getAt(captureList, captureNum)
    —set the registration point to be the center
    set the regPoint of member "processing" to point?
        (((the left of the rect of member "processing")?
        +(the right of the rect of member "processing"))/2,?
        ((the top of the rect of member "processing")?
        +(the bottom of the rect of member "processing"))/2)
            end
Part Two ("Snappy Xtra" program in C++)
This program is written in C++ and integrates the capture of
the customer's image into the sequence of actions performed
by the booth.
Part Three (Written in Macromedia Director)
global spriteNum
on tagImage
    put FileIO(mNew,"write", the pathname & "image.txt")
        into writeObj
    set fileText to field 14
    writeObj(mWriteString, fileText)
``` writeObj(mDispose) end
on flashPhoto
   puppetSprite spriteNum, TRUE
   set the ink of sprite spriteNum=2
   updateStage
   startTimer
   repeat while the timer<6
     nothing
   end repeat
   set the ink of sprite spriteNum=0
   updateStage
   startTimer
   repeat while the timer<60
     nothing
   end repeat end
on exitMovie
   go to frame 1 of movie "jpeg" end global nbr, photoRegis
on enterFrame
   startTimer
   repeat while the timer<120
     nothing
   end repeat end
on exitFrame
   set the fileName of member "photo1" to the pathname & "photo1.bmp"
   set the fileName of member "photo2" to the pathName & "photo2.bmp"
   set the fileName of member "photo3" to the pathname & "photo3.bmp"
   setRegis end
on setRegis
   repeat with nbr=3 down to 1
     put "photo" & nbr into photoRegis—set the registration point to be the center
     set the regPoint of member photoRegis to point?
     (((the left of the rect of member photoRegis)?
     +(the right of the rect of member photoRegis))/2,?
     ((the top of the rect of member photoRegis)?
     +(the bottom of the rect of member photoRegis))/2)
   end repeat end The above computer code is merely an example of one way to implement the present invention. The computer code is not intended to be limiting the scope of the claims herein in any manner. One of ordinary skill in the art would recognize other variations, modifications, and alternatives.

1. Photo Process Flow Diagram

Figure 4E:
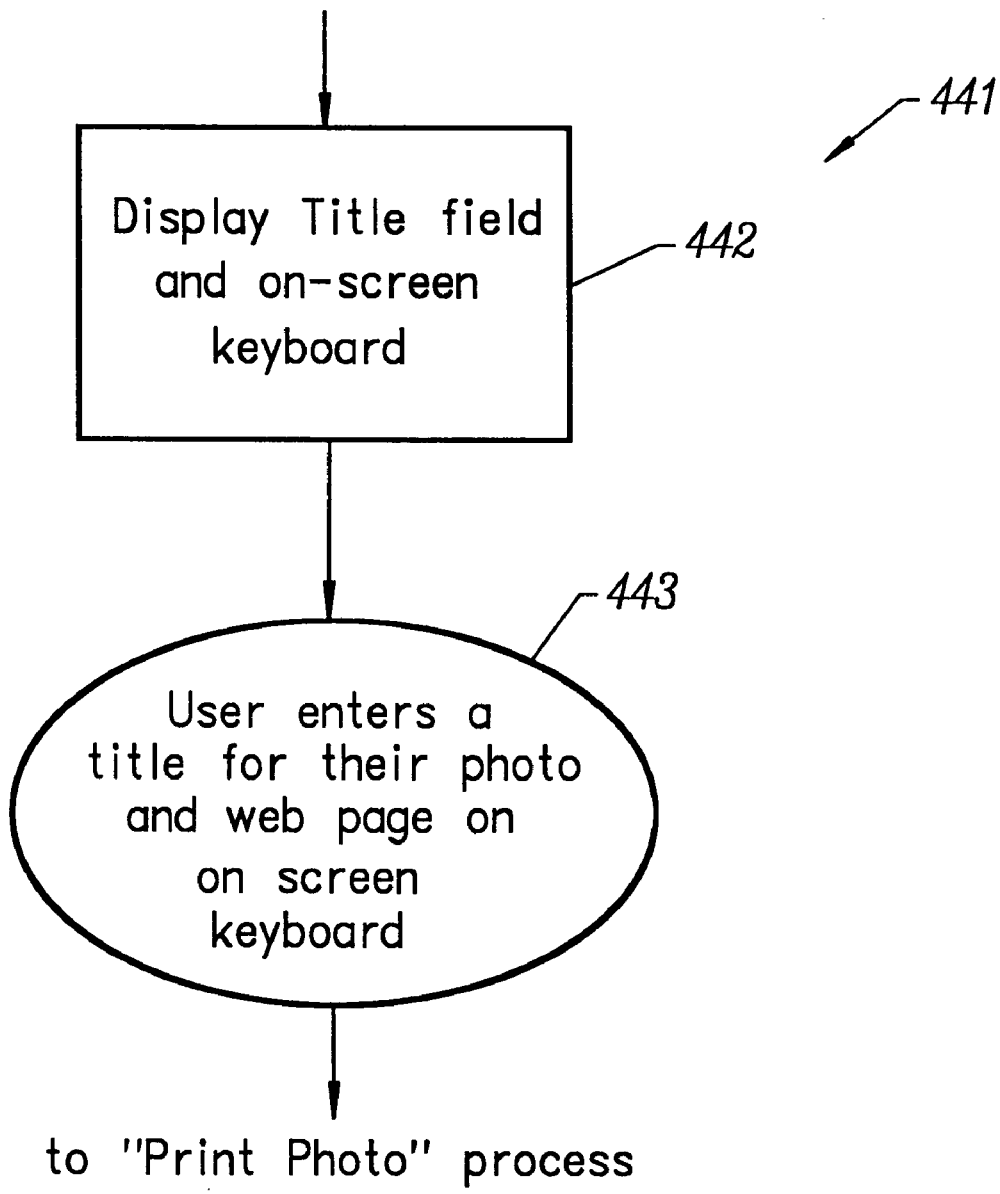
FIG. 4E shows a simplified flow diagram (entitled "Enter Title") which enables a user to create a title to add to a picture.

FIG. 4E (entitled "Process Photo Process") shows a simplified flow diagram 431 of a photo processing method or process according to an embodiment of the present invention. By way of computer software and hardware, the present process photo process (step 431) is performed. The process photo process uses image processing techniques to convert the picture, which is captured from the CCD camera, into a usable graphical or information format. In a specific embodiment, the photo process converts (step 432) the picture into a JPEG file 436 for a web page on the World Wide Web, internet, or network of computers. The present process also converts (step 434) the picture into a bitmap file or picture (i.e., BMP) 437 for outputting onto a hard copy or the like. Accordingly, the selected image is converted into a web page file and/or a hard copy. The method goes to the enter title process, step 441, but is not limited to this process.

2. Photo Process Computer Codes

The present photo process is implemented by way of a computer software program which converts the captured images into a file and then makes that file ready to be placed or displayed on a wide area network of computers such as the World Wide Web or the like. This program has three parts. The first is the code of a program written in Macromedia Director which turns the captured image into a JPEG file. The second is a description of a commercially available program in C++ that comes bundled with Macromedia Director and is known as "Fileio." Fileio helps create the web pages and keeps track of the pages through the use of serial numbers. The third is a description of a commercially available program (an "Xtra") in C++ known as "f3export" which takes the JPEG file and makes it ready for placement onto the world wide web.

Part One or JPEG (Written in Macromedia Director)
global imagePrint, photoRegis
on enterFrame
   getPhoto end
on getPhoto
   put FileIO(mNew,"read", the pathname & "image.txt") into readObj
   put readObj(mReadfile) into imagePrint
   readObj(mDispose)
   put char 1 to 10 of imagePrint into imagePrint
   set the fileName of member "selectedPhoto" to the pathname & imagePrint
   setRegis
   set the visible of sprite 3=TRUE end
on setRegis
   put "selectedPhoto" into photoRegis
   —set the registration point to be the center
   set the regPoint of member photoRegis to point?
   (((the left of the rect of member photoRegis)?
   +(the right of the rect of member photoRegis))/2,?
   ((the top of the rect of member photoRegis)?
   +(the bottom of the rect of member photoRegis))/2) end
     global image, imagePrint, gCounter, identifier, fileText
on enterFrame
   getIdentifier
   makeJPEG end
on getIdentifier
   —creates the identifier by reading the serial number, incrementing it,
   —storing it in field "counterField", then writing it back out to the file.
   —
   put fileIo (mNew,"read",the pathname & "counter.txt") into readObj
   put readObj(mReadFile) into field "counterField"
   readObj(mDispose)
   —
   put integer(field "counterField" +1) into gCounter
   put FileIO(mNew,"write", the pathname & "counter.txt") into writeObj
   put string(gCounter) into fileText
   writeObj(mWriteString, fileText)
   writeObj(mDispose)—
   set identifier="vc-" & gCounter

```
    set image=identifier & ".jpg" end
on makeJPEG
    —set isOK=f3ExportPict(member "selectedPhoto", iden-
        tifier & ".jpg")
    —isOK holds text if there is an error
    —if (isOK<>0) then put isOK—isOK is sent to the
        Message Window
    f3ExportJpeg(member "selectedPhoto", image) end
on exitFrame
    go to frame 1 of movie "writer" end
```

Part Two (Description of Fileio)
Fileio is a program written in C++ that is commerically available and comes bundled with Macromedia director It is integrated with the above program and helps to create the web pages and keeps track of the pages through the use of serial numbers.

Part Three (Description of f3export)
F3export is a commercially available program (an "Xtra") in C++ which takes the JPEG file and makes it ready for placement onto the World Wide Web.

The above computer code is merely an example of one way to implement the present invention. The computer code is not intended to be limiting the scope of the claims herein in any manner. One of ordinary skill in the art would recognize other variations, modifications, and alternatives.

1. Title Process Flow Diagram

FIG. 4E is a simplified flow diagram of an enter title process or writer process according to an embodiment of the present invention. As shown, a title for the picture can be selected, as shown in step 441, according to an embodiment. Here, the user decides upon a title for the picture. The display shows (step 442) a title field and an on-screen keyboard, which has an alphanumeric set of keys. The user enters (step 443) a title for his/her picture using the alphanumeric display or keyboard displayed on the touch screen. Alternatively, the user may use a different interface device such as a standard keyboard for entering the title and other alphanumeric information. The method goes to a print photo process, but is not limited to this process.

2. Title Process Computer Codes

The title or writer process can be implemented into a computer program (entitled "Writer") which enables the customer to create a title to add to their picture. The computer program can be prepared in Macromedia Director, as well as other types of formats. An example of a computer program is shown below.

```
global textEntered, charLength, keyNum, keySprite
on mouseDown
    puppetSound 3 "Shutter2"
    set podKey "0"
    set keyNum=1
    set KeySprite=4
    set charLength=charLength+1
    set the member of sprite keySprite=43
    set the ink of sprite keySprite=7
    updateStage
    if charLength<30 then set textEntered textEntered &
        podKey
    put textEntered into field "title"
    resetKey end global textEntered, charLength, keyNum,
        keySprite
on startMovie
    set the timeoutLength to 180*60
    set the timeoutScript to "exitMovie"
    set textEntered=""
    put textEntered into field "title"
    —set the volume of sound 2 to 200
    —puppetSound 2, "what ru call master"
    —startTimer
    —repeat while the timer<120
    —nothing
    —end repeat
    —puppetSound 3, "please type title"
    —startTimer
    —repeat while the timer<150
    —nothing
    —end repeat
    —puppetSound 4, "Hit the done"
    set CharLength=0
    set the wordWrap of member "title"=TRUE
    startTimer end
on puppetEm
    repeat with i=1 to 41
        puppetSprite (i+3), TRUE
    end repeat end
on resetKey set the member of sprite keySprite=keyNum
    set the ink of sprite keySprite=0
    updatestage end ps on writeFile
    put FileIO(mNew,"write", the pathname & "title.txt") into
        writeObj
    set filetext=field "title"
    writeObj(mWriteString, fileText)
    writeObj(mDispose) end
on exitMovie
    —writeFile
    go to frame 1 of movie "email" end global textString,
        textEntered
on mouseDown
    puppetSound "Shutter2"
    set the member of sprite 44=42
    set the ink of sprite 44=7
    updatestage
    set the member of sprite 44=40
    set the ink of sprite 44=0
    updatestage
    set textString=textEntered
    —set textEntered=textEntered & "*"
    put textEntered into field "title"
    resetKey
    exitMovie end
```

The above computer code is merely an example of one way to implement the present invention. The computer code is not intended to be limiting the scope of the claims herein in any manner. One of ordinary skill in the art would recognize other variations, modifications, and alternatives.

1. Print Process Flow Diagram

Figure 4F:
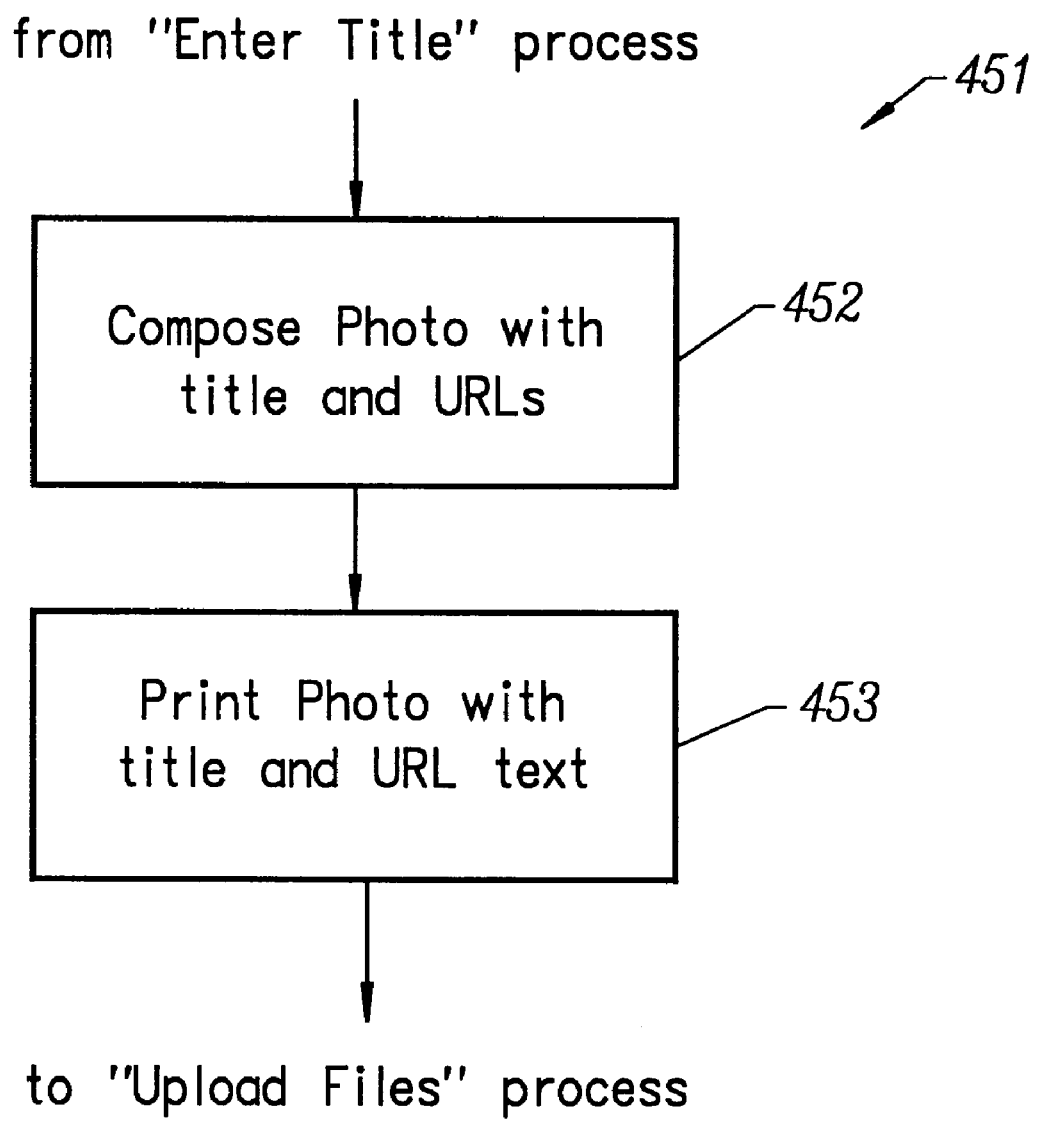
FIG. 4F shows a simplified flow diagram (entitled "Print Photo") which creates a web address and transfers the image file to a web page or selected address.

FIG. 4F (entitled "Print Photo") is a simplified flow diagram 451 of a print photo process according to an embodiment of the present invention. In a specific embodiment, the present method uses a print photo process, step 451. The print photo process composes (step 452) the picture into a photo along with the title and an assigned computer-network address, such as a Uniform Resource Location, e.g., URL. That is, the URL is created for the user.

Additional information includes, among others, title, time, and location of booth such as venue, where the image has been acquired. Next, the process prints (step 453) the picture with title and the URL text. The process also prints out a hard copy of the picture using, for example, a color printer or other an output device. The picture can include a variety of features such as the title, the name of the venue where the booth is located, the background, address (e.g., URL), and other elements. The picture can also be in the form of stickers, which are multiple pictures. Alternatively, the picture can be in the form of a postcard or the like. The method goes to the upload files process, but is not limited to such process.

2. Print Process Computer Codes

The present print process includes software which enables the photograph and its title and associated graphics to be printed out. It has two parts. The first part is the code of a program written in Macromedia Director. The second is a description of a commercially available program in C++ called "Print-O-Matic." Together the two programs allow images to be printed with text and graphics. These codes or programs are merely examples and should not limit the scope of the claims herein.

Part One (Written in Macromedia Director)

```
global imagePrint, VBan, textString, theUrl, identifier,
    slaveOn, gCommPort
—on startMovie
—set textString=""
—end
on registerPOM
    register (xtra "PrintOMatic" , "POMX153-467-02513")
        end
on initCommport
    openXlib (the pathname & "commport")
    if objectP(gCommPort) then gCommPort(mDispose)
    put commport(mNew,"com4",10000,10000) into gCom-
        mPort
    gCommPort(mSetUp,2400,10,0) end
on extMonitorOn
    setOnText
    gCommPort(mWriteFlush)
    gCommPort(mWriteString,slaveOn)
    gCommPort(mWriteString,slaveOn) end
on setOnText
    put field "slaveOnField" into slaveOn end ps on disable-
        Commport
    if objectP(gCommPort) then gCommPort(mDispose) end
On exitMovie
    extMonitorOn
    disableCommport
    go to frame 1 of movie "teaser" end
global imagePrint, VBan, textString, theUrl, identifier
on enterFrame
    registerPOM
    initCommPort
    repeat with i=5 to 8
        startTimer
        repeat while the timer<80
        set the memberNum of sprite 1 to i
        updatestage end repeat
    end repeat end
on assignment
    put fileIo (mNew,"read",the pathname & "composite.txt")
        into readObj
    put readObj(mReadFile) into field "compositeField"
    readObj(mDispose)
    put fileIo (mNew,"read",the pathname & "image.txt")
        into readObj
    put readObj(mReadFile) into tempImage
    readObj(mDispose)
—put fileIo (mNew,"read",the pathname & "title.txt") into
    readObj
—put readObj(mReadFile) into tempString
—readObj(mDispose)
—set charCounter=1
—put char charCounter of tempString into tempChar
—repeat while tempChar <>"*"
—set Z=textString & tempChar
—set charCounter=charCounter+1
—put char charCounter of tempString into tempChar
—end repeat
    put char 1 to 10 of tempImage into imagePrint
    put line 3 of field "compositeField" into VBan
    put "http://www.photopod.com/vc/" & identifier &
        ".htm" into theUrl end
on printit
    set doc=new (xtra "PrintOMatic")
    if not objectP(doc) then
        Alert "We're Sorry, there is no currently selected
            printer. Printing is not available at this time. Please
            contact staff."
    else
        cursor 4
        setMargins doc, Rect(16,28,1013,705)
        setLandscapeMode doc, TRUE
        setDocumentName doc,"PhotoPod Picture"
        newPage doc
—assign the frame for the banner
    newFrame doc, rect(0,0,284,213), FALSE
—put the banner
    appendFile doc, the pathName & VBan, FALSE
—assign the frame for the photo
    newFrame doc, rect(9,9,231,175), FALSE
—put the image
    appendFile doc, the pathName & imagePrint, FALSE
—set the type for title and URL
    newFrame doc, rect(0,184,222,213), FALSE
    setTextLineSpacing doc, 0
    setTextFont doc, "HandelGothic BT"
    setTextStyle doc, "normal"
    setTextJust doc, "center"
—colors were to be set according to background matrix
    but they are hard coded now
    setColor doc, 203, 59,17
—put textstring
    setTextSize doc, 9
    append doc, textstring, RETURN
—colors were to be set according to background matrix
—but they are hard coded now
    setColor doc, 227, 150, 13
—put theURL
    setTextSize doc, 8
    append doc, theURL, FALSE
    setProgressloc doc, 641
``` print doc
—get rid of the document object
set doc=0
end if end
on exitFrame
  assignment
  printit end
Part Two (Description of Print-O-Matic)
Print-O-Matic is a commerically available program written in C++which, when combined with the above program, enables the customer's image to be printed out onto a photograph along with text and graphics.

The above computer code is merely an example of one way to implement the present invention. The computer code is not intended to be limiting the scope of the claims herein in any manner. One of ordinary skill in the art would recognize other variations, modifications, and alternatives.

1. Upload Process Flow Diagram

Figure 4G:
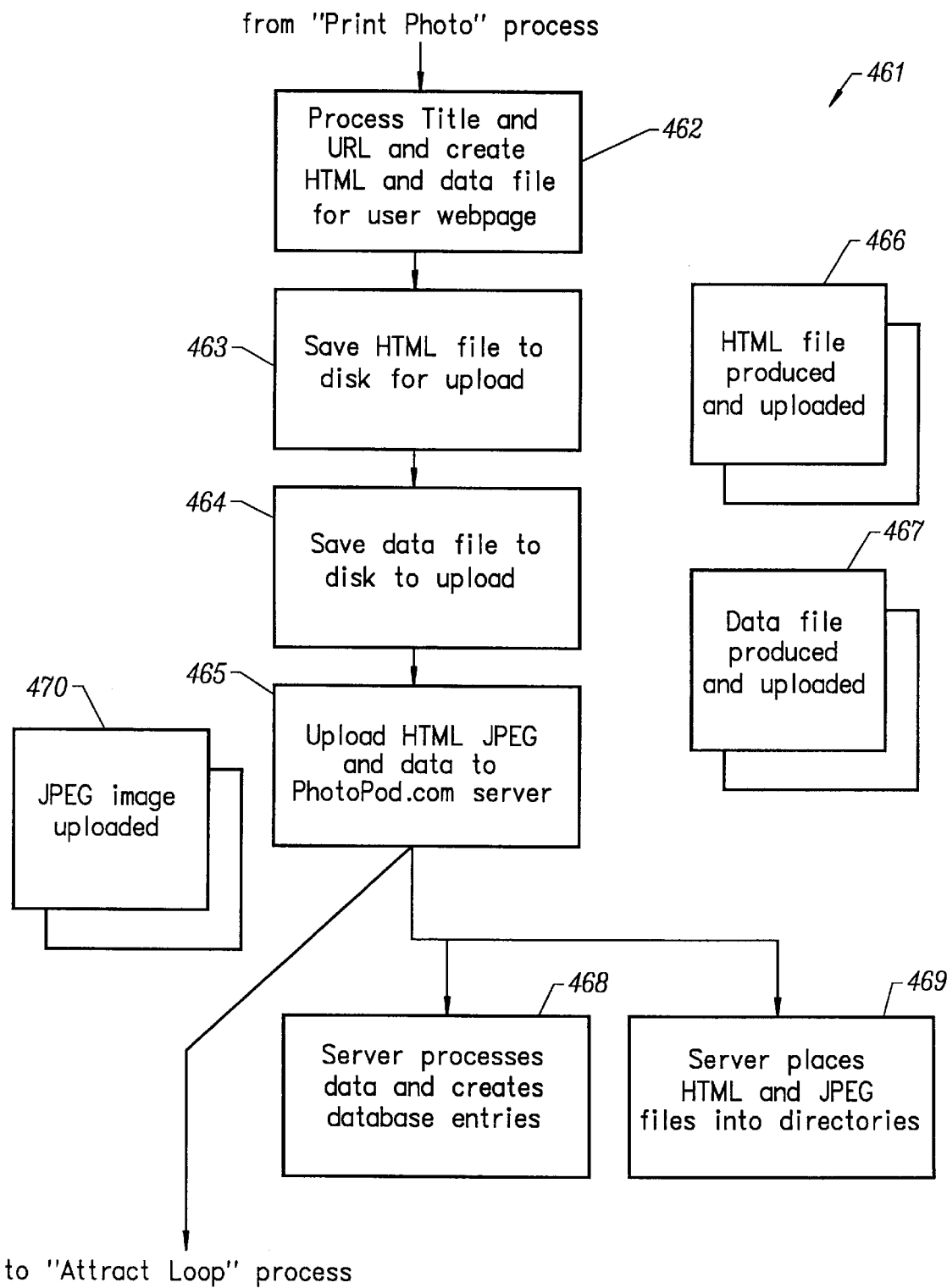
FIG. 4G shows a simplified flow diagram (entitled "Upload Files") which allows a picture or image to be uploaded onto a web page or selected address

FIG. 4G is a simplified flow diagram 461 of an upload files process according to an embodiment of the present invention. In a specific embodiment, the method also has a step of uploading (step 461) the information as files. The uploading process converts (step 462) the title, URL, and other information into widely-used format including, for example, HTML and a data file. The HTML file is permanently or temporarily stored (step 463) onto a memory device such as a hard disk, which holds the HTML file 466. The data file is also stored (step 464) in the memory device or other memory. The HTML, JPEG 470, and data file are uploaded (step 465) onto, for example, a web server or multiple web servers. As merely an example, the server is a central server such as, for example, PhotoPod.com server, but can be others. The server categorizes the files in specific locations such as directories (step 469) and/or in a data base (step 468) as entries. The server is coupled to a wide area network of computers such as the internet, as well as other like networks. A user of the network of computers can access the server to view the image, including the title and other information, which has been captured at the booth.

2. Upload Process Computer Codes

The present upload process is implemented in part by a computer software program which creates a web address and transfers the image file to the web page, as shown below. It has two parts. The first part is the code of a program written in Macromedia Director, and the second part is a description of a commercially available program known as Mailsend.

Part One (Written in Macromedia Director)
global gCounter, count, identifier, textString, image, linkColor, fontColor, webtile global dateString, date, month, day, year global time, timeString, hours, minutes, isPM
on enterFrame
  getHTMLVars
  getCount
  getDateString
  getDate
  getTimeString
  getTime
  makeAttachTxt
  makeAddTxt
  makeIdentTxt
  makeHTML
  emailIt end
on getHTMLVars
  put fileIo (mNew,"read",the pathname & "composite.txt") into readObj
  put readObj(mReadFile) into field "HTMLVars Field"
  readObj(mDispose)
  put line 5 of field "HTMLVars Field" into linkColor
  put line 4 of field "HTMLVars Field" into fontColor
  put line 2 of field "HTMLVars Field" into webtile end
on getCount
  put gCounter into count end
on getDateString
  put the long date into dateString end
on getDate
  put the date into date
  set the itemDelimiter="/"
  put value(item 1 of date) into month
  put value(item 2 of date) into day
  put value(item 3 of date) into year end
on getTimeString
  put the time & "EST" into timeString end
on getTime put the time into time
  set the itemDelimiter=":"
  put value(item 1 of time) into hours
  put value(word 1 of item 2 of time) into minutes
  put word 2 of item 2 of time into ampm
  put (ampm="PM") into isPM end
on makeAttachTxt
  put "-a" & identifier & ".jpg" into line 3 of field "attachText Field"
  put "-a" & identifier & ".htm" into line 4 of field "attachText Field"
  put FileIO(mNew,"write", the pathname & "attach.txt") into writeObj
  set filetext=field "attachText Field"
  writeObj(mWriteString, fileText)
  writeObj(mDispose) end
on makeAddTxt
  put "-i" & identifier & ".txt" into line 5 of field "addtobody Field"
  put FileIO(mNew,"write", the pathname & "addtobody.txt") into writeObj
  set filetext=field "addtobody Field"
  writeObj(mWriteString, fileText)
  writeObj(mDispose) end
on makeIdentTxt
  put "identifie$" & identifier & "$@@" into line 1 of field 8
  put "dat$" & date & "$@@" into line 2 of field 8
  put "da$" & day & "$@@" into line 3 of field 8
  put "mont$" & month & "$@@" into line 4 of field 8
  put "yea$" & year & "$@@" into line 5 of field 8
  put "text_strin$" & textstring & "$@@" into line 6 of field 8
  put "po$vc$@@" into line 7 of field 8
  put "podstrin$Virtua Cafe- Miami, Florida$@@" into line 8 of field 8
  put "ispm$" & isPM & "$@@" into line 9 of field 8
  put "coun$" & count & "$@@" into line 10 of field 8
  put "time_strin$" & timestring & "$@@" into line 11 of field 8
  put "date_strin$" & datestring & "$@@" into line 12 of field 8 put "hou$" & hours & "$@@" into line 13 of field 8
put "minute$" & minutes & "$@@" into line 14 of field 8
put "webtil$" & webtile & "$@@" into line 15 of field 8
put FileIO(mNew,"write", the pathname & identifier & ".txt") into writeObj
set filetext=field 8
writeObj(mWriteString, fileText)
writeObj(mDispose) end
on makeHTML
   duplicate member 11, member 9 put timeString after char 14 of line 4 of field 9
   put dateString after char 12 of line 4 of field 9
   put textString after char 10 of line 4 of field 9
   put textString after char 37 of line 8 of field 9
   put textString after char 34 of line 9 of field 9
   put date after char 30 of line 11 of field 9
   put hours after char 30 of line 12 of field 9
   put textString after char 37 of line 13 of field 9
   put image after char 36 of line 14 of field 9
   put webtile after char 77 of line 17 of field 9
   put linkColor after char 47 of line 17 of field 9
   put linkColor after char 38 of line 17 of field 9
   put fontColor after char 12 of line 17 of field 9
   put textString after char 46 of line 18 of field 9
   put fontColor after char 30 of line 18 of field 9
   put image after char 18 of line 19 of field 9
   put FileIO(mNew,"write", the pathname & identifier & ".htm") into writeObj
   set filetext=field 9
   writeObj(mWriteString, fileText)
   writeObj(mDispose) end
on emailIt
   —run the MailSend program to attach the HTML and Image
   —files to an e-mail message. It is minimized
   open "start" & the pathname & "attach.lnk"
   —run the MailSend program to add the variables to a mail message
   —files to an e-mail message. It is minimized
   open "start" & the pathname & "addtobod.lnk" end
on exitFrame
   go to frame 1 of movie "print" end
Part Two (Decription of Mailsend)
Mailsend is a commercially available program written in C++. It is integrated with the above program, and together they work to mail the customer's image onto a page on the World Wide Web.

The above computer code is merely an example of one way to implement the present invention. The computer code is not intended to be limiting the scope of the claims herein in any manner. One of ordinary skill in the art would recognize other variations, modifications, and alternatives.

Although the above has been generally described in terms of hardware and software, it will be recognized that other variations can exist. As merely an example, the functionality of the present invention can be further combined, or even separated, in terms of hardware. Alternatively, the functionality of the present invention can be further combined, or even separated, in terms of computer software or programs. Furthermore, the functionality of the present invention can be further combined, or even separated, in terms of a combination of computer software or programs and hardware. Accordingly, the above descriptions in terms of hardware and software are not intended to limit the scope of the claims herein.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A computer program product for an interactive public kiosk including a processor for automatically forming a web page including an image of a user, comprising:
   a computer readable media including:
      code that directs the processor to capture an image of the user;
      code that directs the processor to modify the image according to a user selected theme to form a modified image;
      code that directs the processor to determine a URL address for the web page;
      code that directs the processor to create a file in response to the user selected theme and the modified image; and
      code that directs the processor to upload the file to be located at the URL address to a server.

2. The computer program product of claim 1 wherein computer readable media includes code that directs the processor to determine of the user selected theme in response to user input.

3. The computer program product of claim 1 wherein the code that directs the processor to modify the image comprises code that directs the processor to combine the image of the user with a predefined image.

4. The computer program product of claim 1 wherein the code that directs the processor to capture the image comprises:
   code that directs the processor to capture a plurality of images of the user;
   code that directs the processor to display the plurality of images to the user on a display; and
   code that directs the processor to determine the image of the user in response to user input.

5. The computer program product of claim 1 wherein the file is an HTML file.

6. The computer program product of claim 1 wherein the code that directs the processor to create a file comprises:
   code that directs the processor to receive textual input; and
   code that directs the processor to create a file in response to the user selected theme, the modified image and the textual input.

7. The computer program product of claim 1
   wherein the code that directs the processor to create the file comprises code that directs the processor to create the file in response to the user selected theme, the modified image, and an audio sample; and
   wherein the code that directs the processor to upload comprises code that directs the processor to upload the modified image, the file to be located at the URL address, and the audio sample to the server.

8. The computer program product of claim 7 wherein the audio sample is a pre-recorded audio sample in response to the user-selected theme.

9. The computer program product of claim 7 wherein the computer readable media further comprises:

code that directs the processor to capture the audio sample in response to user input from a microphone.

10. The computer program product of claim 1 wherein the computer readable media further comprises:

code that directs the processor to output the modified image and the URL address to a printer.

11. The computer program product of claim 1 wherein the computer readable media further comprises:

code that directs the processor to upload the modified image to the server.

12. A computer program product for an interactive public kiosk including a processor, a display, a user input device, an output device, and a camera, coupled to a server, for generating an output file, comprising:

a computer readable memory including:

code that directs the processor to capture an image of the user with the camera;

code that directs the processor to form a modified image in response to the image and to user input from the user input device;

code that directs the processor to display the modified image on the display;

code that directs the processor to determine a computer network-based address for the output file;

code that directs the processor to generate the output file in response to the modified image and the computer-based address; and code that directs the processor to transmit the modified image and the output file with the output device to the server.

13. The computer program product of claim 12 wherein the output file is an HTML file.

14. The computer program product of claim 12 wherein the computer network-based address is an URL address.

15. The computer program product of claim 12 wherein the computer readable memory also includes:

code that directs the processor to print a copy of the modified image on an attached printer.

16. The computer program product of claim 1 wherein the computer readable memory also includes:

code that directs the processor to output audio signals to output speakers.

17. The computer program product of claim 1 wherein the server is an electronic mail server.

18. The computer program for a public photo booth including a processing portion, for outputting modified images, the computer program including:

a computer readable media including:

code that directs the processor to capture a plurality of images of a user;

code that directs the processor to display the plurality of images of the user on a display;

code that directs the processor to determine an image of the user from the plurality of images of the user in response to user input;

code that directs the processor to determine another image in response to user input;

code that directs the processor to form a modified image in response to the image of the user and the another image;

code that directs the processor to display the modified image on the display;

code that directs the processor to determine a URL for a web page;

code that directs the processor to output the modified image and the URL to a local printer;

code that directs the processor to generate a web page including the modified image; and code that directs the processor to output the web page to a remote server with a modem.

19. The computer program of claim 18 wherein the web page comprises an HTML file linked to the modified image.

20. The computer program of claim 18 wherein the computer readable media further comprises:

code that directs the processor to capture an audio message of the user with a microphone; and wherein the code that directs the processor to generate a web page comprises code that directs the processor to generate the web page including the modified image and the audio message.

* * * * *